(12) United States Patent
Chai et al.

(10) Patent No.: US 11,463,145 B2
(45) Date of Patent: Oct. 4, 2022

(54) INFORMATION TRANSMISSION METHOD AND DEVICE

(71) Applicant: HUAWEI TECHNOLOGIES CO., LTD., Guangdong (CN)

(72) Inventors: Xiaomeng Chai, Shanghai (CN); Yiqun Wu, Shanghai (CN); Lei Wang, Shanghai (CN); Yan Chen, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 78 days.

(21) Appl. No.: 17/088,159

(22) Filed: Nov. 3, 2020

(65) Prior Publication Data

US 2021/0135730 A1 May 6, 2021

Related U.S. Application Data

(63) Continuation of application No. PCT/CN2019/084720, filed on Apr. 28, 2019.

(30) Foreign Application Priority Data

May 4, 2018 (CN) .......................... 201810420698.0

(51) Int. Cl.
*H04B 7/06* (2006.01)
*H04B 7/0456* (2017.01)
*H04W 72/04* (2009.01)

(52) U.S. Cl.
CPC ......... *H04B 7/0639* (2013.01); *H04B 7/0486* (2013.01); *H04W 72/042* (2013.01); *H04W 72/0446* (2013.01); *H04W 72/0453* (2013.01)

(58) Field of Classification Search
CPC .. H04B 7/0456; H04B 7/0486; H04B 7/0623; H04B 7/063; H04B 7/0639; H04B 7/088;
(Continued)

(56) References Cited

U.S. PATENT DOCUMENTS 10,834,744 B2 * 11/2020 Bae .......................... H04L 1/00
2010/0215009 A1 8/2010 Yu et al.
(Continued)

FOREIGN PATENT DOCUMENTS

AU 2017442494 A1 * 7/2020 ............ H04W 72/02
CN 102356563 A 2/2012
(Continued)

OTHER PUBLICATIONS

Huawei, HiSilicon,"RAN2 aspects of UL beam management," 3GPP TSG-RAN WG2 Meeting-NR#2, R2-1706719, Qingdao, China, Jun. 27-29, 2017, 4 pages.
(Continued)

*Primary Examiner* — Robert J Lopata
(74) *Attorney, Agent, or Firm* — Fish & Richardson P.C.

(57) ABSTRACT

Embodiments of this application provide an information transmission method and a device. The method includes receiving at least one precoding configuration from an access network device, starting a timer, and then sending uplink information to the access network device on a configured grant-free time-frequency resource in valid duration of the timer by using the at least one precoding configuration.

25 Claims, 9 Drawing Sheets

(58) Field of Classification Search
CPC ........... H04W 72/042; H04W 72/0446; H04W 72/0453
USPC ........................................................ 370/329
See application file for complete search history.

(56) References Cited

U.S. PATENT DOCUMENTS

| | | | |
|---|---|---|---|
| 2016/0227520 A1* | 8/2016 | Davydov | H04B 7/0456 |
| 2016/0302076 A1* | 10/2016 | Chou | H04W 16/14 |
| 2018/0092122 A1 | 3/2018 | Babaei et al. | |
| 2019/0222273 A1* | 7/2019 | Liu | H04L 25/0222 |
| 2019/0261354 A1* | 8/2019 | Fakoorian | H04L 1/1671 |
| 2020/0059960 A1* | 2/2020 | Shimezawa | H04W 72/14 |
| 2020/0136679 A1* | 4/2020 | Shen | H04B 7/0617 |
| 2020/0229230 A1* | 7/2020 | Wang | H04L 1/189 |
| 2021/0022174 A1* | 1/2021 | Park | H04W 72/1284 |

FOREIGN PATENT DOCUMENTS

| | | | | |
|---|---|---|---|---|
| CN | 106507497 A | 3/2017 | | |
| EP | 3479616 B1 * | 5/2021 | ............... | H04L 1/00 |
| WO | 2017041685 A1 | 3/2017 | | |

OTHER PUBLICATIONS

Huawei, HiSilicon, "Data transmission in low activity state," 3GPP TSG-RAN WG2 #95bis, R2-166284, Kaohsiung, Oct. 10-14, 2016, 11 pages.
Extended European Search Report in European Application No. 19796158.4, dated Apr. 22, 2021, 9 pages.
Office Action issued in Chinese Application No. 201810420698.0 dated Mar. 2, 2021, 8 pages.
Office Action issued in Indian Application No. 202037048891 dated Jul. 27, 2021, 7 pages.
Huawei, HiSilicon, "Configuration on Type 1 Grant-Free for Active UE," 3GPP TSG-RAN WG2 Meeting #99bis, R2-1711430, Prague, Czech Republic, Oct. 9-13, 2017, 7 pages.
3GPP TS 38.211 V15.1.0 (Mar. 2018), "3rd Generation Partnership Project; Technical Specification Group Radio Access Network; NR; Physical channels and modulation(Release 15)," Mar. 2018, 90 pages.
Huawei, HiSilicon, "Modelling of Grant free and SPS," 3GPP TSG-RAN AdHoc, R2-1707247, Qingdao, China, Jun. 27-29, 2017, 7 pages.
Huawei, HiSilicon, "Considerations on grant free transmission for NR," 3GPP TSG-RAN WG2 Meeting #96, R2-168478, Reno, Nevada, USA, Nov. 14-18, 2016, 2 pages.
PCT International Search Report and Written Opinion issued in International Application No. PCT/CN2019/084720 dated Jul. 30, 2019, 15 pages (with English translation).

* cited by examiner

INFORMATION TRANSMISSION METHOD AND DEVICE

CROSS-REFERENCE TO RELATED APPLICATIONS

This application is a continuation of International Application No. PCT/CN2019/084720, filed on Apr. 28, 2019, which claims priority to Chinese Patent Application No. 201810420698.0, filed on May 4, 2018, The disclosures of the aforementioned applications are hereby incorporated by reference in their entireties.

TECHNICAL FIELD

Embodiments of this application relate to the field of communications technologies, and in particular, to an information transmission method and a device.

BACKGROUND

A fifth generation mobile communications (the 5th Generation Mobile Communication, 5G for short) new radio access technology (New Radio Access Technology, NR for short) is dedicated to supporting higher system performance, to support different services, different deployment scenarios, and different spectrums.

To implement low-latency and high-reliability service transmission, a terminal device and an access network device may transmit uplink information in a grant-free transmission mode. In a process in which the terminal device and the access network device perform grant-free transmission, a plurality of antennas are used for transmission. When configuring a grant-free time-frequency resource for the terminal device, the access network device further needs to configure an antenna transmission parameter. In a validity period of the configured grant-free time-frequency resource, transmission is all performed by using the same antenna transmission parameter.

However, a precoding configuration in the antenna transmission parameter is relatively sensitive to channels; to be specific, a precoding configuration at a moment may not be applicable to another moment. If a same precoding configuration keeps being used in the validity period of the grant-free transmission resource, a severe system performance loss is caused.

SUMMARY

Embodiments of this application provide an information transmission method and a device, to improve system performance of grant-free transmission.

According to a first aspect, an embodiment of this application may provide an information transmission method, including:

receiving at least one precoding configuration from an access network device; starting a timer after receiving the at least one precoding configuration; and sending uplink information to the access network device on a configured grant-free time-frequency resource in valid duration of the timer by using the at least one precoding configuration.

In the method, use duration of a precoding configuration may be limited by using the valid duration of the timer, and the uplink information is sent on the grant-free time-frequency resource by using the at least one precoding configuration. Therefore, a precoding configuration used for transmitting the uplink information on the grant-free time-frequency resource is flexible and variable, so that inadaptation of a precoding configuration caused by a channel change is effectively avoided, thereby improving system performance.

In an implementable manner, the information transmission method may further include:

receiving configuration information of the valid duration from the access network device.

The access network device configures the valid duration of the timer. Therefore, the valid duration of the timer can be more flexible, and the use duration of the precoding configuration is more flexible, so that the inadaptation of the precoding configuration caused by the channel change is effectively avoided, thereby improving the system performance.

In another implementable manner, the configuration information of the valid duration may be located in a radio resource control RRC message or downlink control information DCI.

In still another implementable manner, each precoding configuration includes at least one of the following: a sounding reference signal resource indicator SRI, a transmission rank indicator TRI, and a transmitted precoding matrix indicator TPMI.

In still another implementable manner, if there are a plurality of precoding configurations, before the sending uplink information to the access network device on a configured grant-free time-frequency resource in valid duration of the timer by using the at least one precoding configuration, the method may further include:

traversing the plurality of precoding configurations by using a preset granularity of a frequency domain resource unit, to determine a precoding configuration corresponding to each frequency domain resource unit of the grant-free time-frequency resource, where two adjacent frequency domain resource units in the grant-free time-frequency resource correspond to different precoding configurations.

In the method, a terminal device may traverse the plurality of precoding configurations based on the preset granularity of the frequency domain resource unit, to determine the precoding configuration of each frequency domain resource unit of the grant-free time-frequency resource, thereby ensuring flexibility of precoding configurations of different frequency domain resource units. In addition, the uplink information is transmitted on each frequency domain resource unit by using the precoding configuration corresponding to each frequency domain resource unit, so that a diversity gain of the terminal device can be effectively increased.

In still another implementable manner, the granularity of the frequency domain resource unit includes any one of the following: a resource block RB and a precoding resource block group PRG.

In still another implementable manner, if there are a plurality of precoding configurations, before the sending uplink information to the access network device on a configured grant-free time-frequency resource in valid duration of the timer by using the at least one precoding configuration, the method further includes:

traversing the plurality of precoding configurations by using a preset granularity of a time-domain resource unit, to determine a precoding configuration corresponding to each time-domain resource unit of the grant-free time-frequency resource, where two adjacent time-domain resource units in the grant-free time-frequency resource correspond to different precoding configurations.

In the method, the terminal device may traverse the plurality of precoding configurations based on the preset granularity of the time-domain resource unit, to determine the precoding configuration of each time-domain resource unit of the grant-free time-frequency resource, thereby ensuring flexibility of precoding configurations of different time-domain resource units, so that the inadaptation of the precoding configuration caused by the channel change is effectively avoided, thereby improving the system performance. In addition, the uplink information is transmitted on each time-domain resource unit by using the precoding configuration corresponding to each time-domain resource unit, so that a diversity gain of the terminal device can be effectively increased.

In still another implementable manner, a length of the granularity of the time-domain resource unit may be a time length of a time-frequency resource for one transmission.

In still another implementable manner, the receiving at least one precoding configuration from an access network device may include:

receiving configuration information of grant-free transmission from the access network device, where the configuration information of the grant-free transmission includes the at least one precoding configuration, and configuration information of the grant-free time-frequency resource.

In still another implementable manner, the configuration information of the grant-free transmission further includes the configuration information of the valid duration.

In still another implementable manner, the method may further include:

if the timer is invalid, sending the uplink information to the access network device on the configured grant-free time-frequency resource by using a preset precoding configuration.

In still another implementable manner, the method may further include:

if the timer is invalid, traversing a plurality of preset precoding configurations by using the preset granularity of the frequency domain resource unit, to determine the precoding configuration corresponding to each frequency domain resource unit of the grant-free time-frequency resource, where two adjacent frequency domain resource units in the grant-free time-frequency resource correspond to different precoding configurations.

In still another implementable manner, the method may further include:

if the timer is invalid, traversing a plurality of preset precoding configurations by using the preset granularity of the time-domain resource unit, to determine the precoding configuration corresponding to each time-domain resource unit of the grant-free time-frequency resource, where two adjacent time-domain resource units in the grant-free time-frequency resource correspond to different precoding configurations.

In the method, the plurality of implementations that the terminal device has when the timer is invalid are further provided, thereby ensuring variability and the flexibility of the precoding configurations of different time-domain resource units or frequency domain resource units, so that the inadaptation of the precoding configuration caused by the channel change is effectively avoided, thereby improving the system performance.

According to a second aspect, an embodiment of this application may further provide an information transmission method, including:

sending at least one precoding configuration to a terminal device; and receiving uplink information from the terminal device, where the uplink information is information sent by the terminal device on a configured grant-free time-frequency resource in valid duration of a timer by using the at least one precoding configuration, and the timer is started by the terminal device after the terminal device receives the at least one precoding configuration.

In an implementable manner, before the sending at least one precoding configuration to a terminal device as described above, the information transmission method may further include:

determining the at least one precoding configuration based on a multi-antenna transmission capability of the terminal device.

In another implementable manner, the multi-antenna transmission capability may include at least one of the following: a maximum quantity of multi-antenna transmission ports, a quantity of transport layers, coherent information between antenna ports, and the like that are supported by the terminal device.

In still another implementable manner, the method may further include:

sending configuration information of the valid duration to the terminal device.

In still another implementable manner, the configuration information of the valid duration may be located in an RRC message or DCI.

In still another implementable manner, each precoding configuration may include at least one of the following: an SRI, a TRI, and a TPMI.

In still another implementable manner, the sending at least one precoding configuration to a terminal device includes:

sending configuration information of grant-free transmission to the terminal device, where the configuration information of the grant-free transmission includes the at least one precoding configuration, and configuration information of the grant-free time-frequency resource.

In still another implementable manner, the configuration information of the grant-free transmission further includes the configuration information of the valid duration.

According to a third aspect, an embodiment of this application may further provide a terminal device, including:

a receiving module, configured to receive at least one precoding configuration from an access network device;

a processing module, configured to start a timer; and a sending module, configured to send uplink information to the access network device on a configured grant-free time-frequency resource in valid duration of the timer by using the at least one precoding configuration.

Based on a same inventive concept, because a problem-resolving principle of the terminal device corresponds to the solution in the method design of the first aspect, for implementation of the terminal device, refer to implementation of the method. Repeated content is not described again.

According to a fourth aspect, an embodiment of this application may further provide an access network device, including:

a sending module, configured to send at least one precoding configuration to a terminal device; and a receiving module, configured to receive uplink information from the terminal device, where the uplink information is information sent by the terminal device on a configured grant-free time-frequency resource in valid duration of a timer by using the at least one precoding configuration, and the timer is started by the terminal device after the terminal device receives the at least one precoding configuration.

Based on a same inventive concept, because a problem-resolving principle of the access network device corresponds to the solution in the method design of the second aspect, for implementation of the network device, refer to implementation of the method. Repeated content is not described again.

According to a fifth aspect, an embodiment of this application may further provide a computer program product, where the computer program product includes corresponding program code used to perform any signal transmission method provided in the first aspect of embodiments of this application.

According to a sixth aspect, an embodiment of this application further provides a computer-readable storage medium, where the storage medium is configured to store a computer program product, the computer program product includes program code, and the program code may include corresponding program code used to perform any signal transmission method provided in the first aspect of embodiments of this application.

When the computer program product runs on a computer, the computer may be enabled to perform any signal transmission method provided in the first aspect of the embodiments of this application.

According to a seventh aspect, an embodiment of this application further provides a computer program product, where the computer program product includes corresponding program code used to perform any signal transmission method provided in the second aspect of embodiments of this application.

According to an eighth aspect, an embodiment of this application further provides a computer-readable storage medium, where the storage medium is configured to store a computer program product, the computer program product includes program code, and the program code may include any signal transmission method provided in the second aspect of embodiments of this application.

When the computer program product runs on a computer, the computer may be enabled to perform any signal transmission method provided in the second aspect of the embodiments of this application.

According to the information transmission methods and the devices provided in the embodiments of this application, the terminal device may receive the at least one precoding configuration from the access network device, start the timer, and send the uplink information to the access network device on the configured grant-free time-frequency resource in the valid duration of the timer by using the at least one precoding configuration. In the solutions, the use duration of the precoding configuration may be limited by using the valid duration of the timer, and the uplink information is sent on the grant-free time-frequency resource by using the at least one precoding configuration. Therefore, the precoding configuration used for transmitting the uplink information on the grant-free time-frequency resource is flexible and variable, so that the inadaptation of the precoding configuration caused by the channel change is effectively avoided, thereby improving the system performance.

DESCRIPTION OF EMBODIMENTS

An information transmission method, a terminal device, and an access network device that are provided in the following embodiments of this application are applicable to a 5G NR communications technology or an evolved communications technology of any other communications technology.

Figure 1:
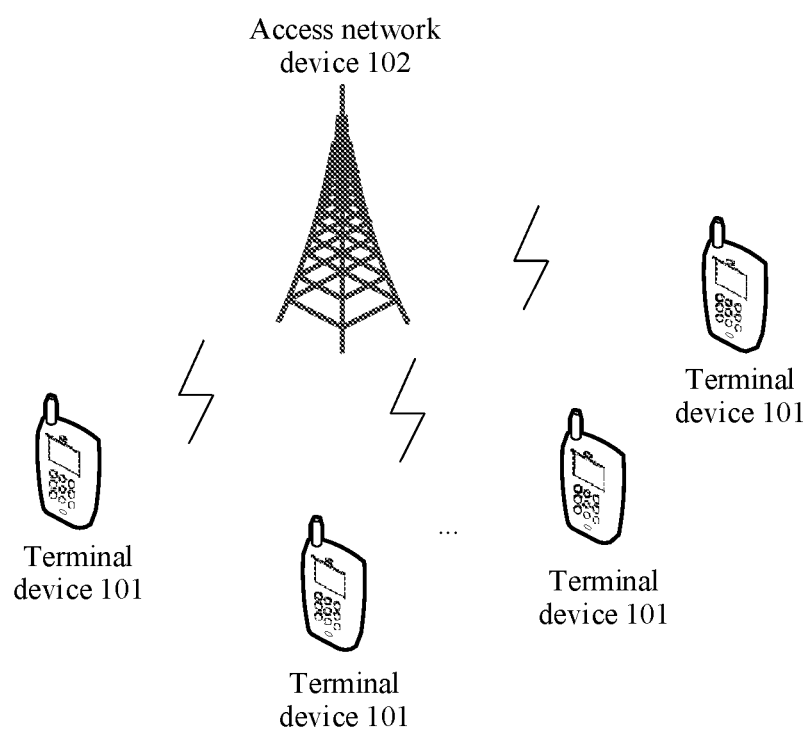
FIG. 1 is an architectural diagram of a communications system to which an embodiment of this application is applicable.

FIG. 1 is an architectural diagram of a communications system to which an embodiment of this application is applicable. Methods provided in the following embodiments of this application may be applied to the communications system shown in FIG. 1. As shown in FIG. 1, the communications system includes at least one access network device 101. Each access network device 101 serves at least one terminal device 102 by using a wireless interface.

It should be noted that both a quantity of access network devices 101 included in the communications system shown in FIG. 1 and a quantity of terminal devices 102 served by each access network device 101 are deployed based on an actual network requirement. This is not specifically limited in this application.

FIG. 1 shows only an example of one access network device 101 and terminal devices 102 served by the access network device 101. Content shown in FIG. 1 does not specifically limit the quantity of access network devices 101 included in the communications system and the quantity of terminal devices 102 served by the access network devices 101.

The terminal devices 102 shown in FIG. 1 may be devices that provide data connectivity for a user, for example, handheld devices with a wireless connection function, or wireless devices with wireless modems. A wireless terminal may communicate with one or more core networks through a radio access network (Radio Access Network, RAN for short). The wireless terminal may be a mobile terminal such as a mobile phone (also referred to as a "cellular" phone) or a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (Personal Communication Service, PCS for short) phone, a cordless telephone set, a Session Initiation Protocol (Session Initiation Protocol, SIP for short) phone, a wireless local loop (Wireless Local Loop, WLL for short) station, or a personal digital assistant (Personal Digital Assistant, PDA for short). The wireless terminal may also be referred to as a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a user agent (User Agent), a user device (User Device), user equipment (User Equipment), a smartphone (smartphone), an automatic driving device (Automotive Device), or an internet of things device (Internet Of Things Device).

The access network device 101 shown in FIG. 1 may be a form of a radio station, and is a device that communicates with wireless terminal devices in specific radio coverage. The access network device may be configured to: mutually convert a received over-the-air frame and an internet protocol (Internet Protocol, IP for short) packet, and serve as a router between the wireless terminals and a remaining part of an access network, where the remaining part of the access network may include an internet protocol (IP) network. For example, the access network device may be a base station, for example, any one of a basic transmission station (Base Transceiver Station, BTS for short), a basic site (Node Base, NodeB for short), an evolved NodeB (evolved Node B, eNB for short), or a base station (for example, a gNB) in a 5G NR system. This is not limited in this application.

Examples are provided below for description with reference to a plurality of embodiments.

Figure 2:
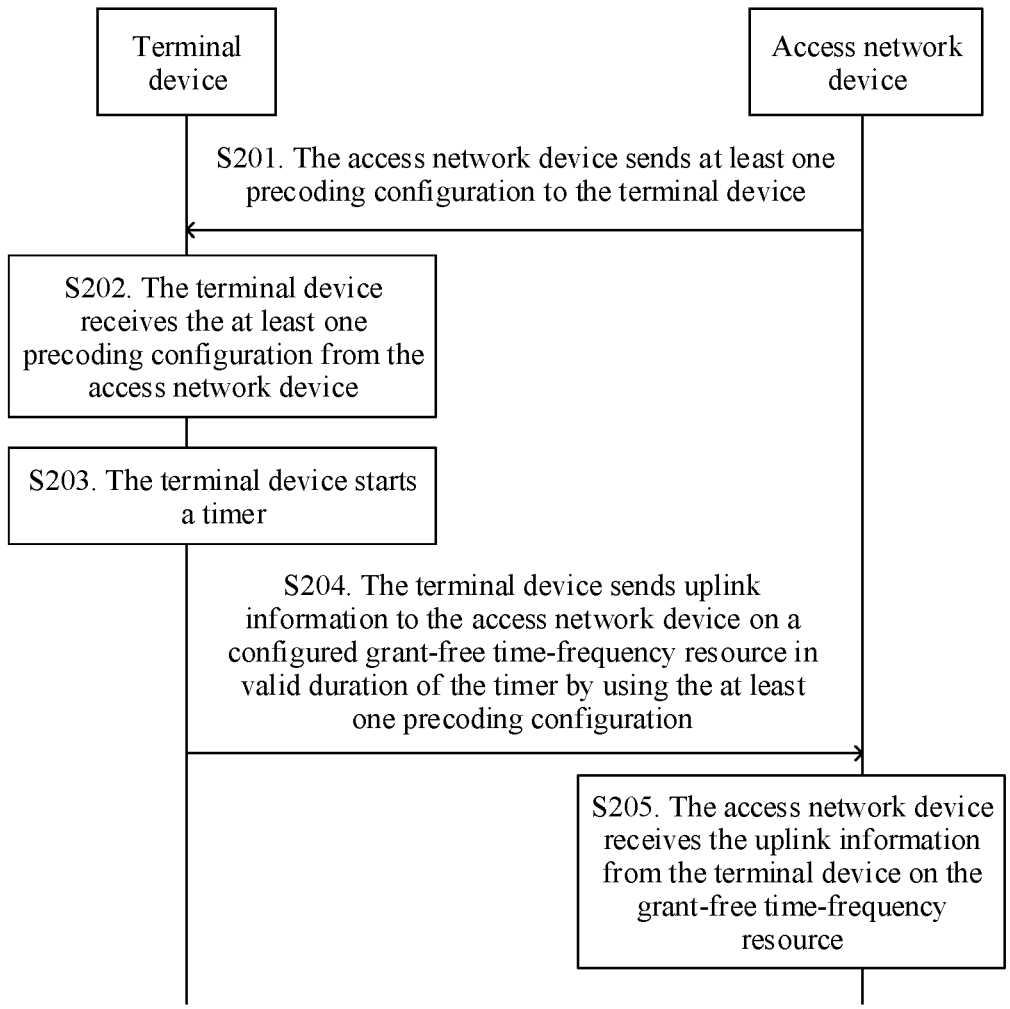
FIG. 2 is a flowchart 1 of an information transmission method according to an embodiment of this application.

FIG. 2 is a flowchart 1 of an information transmission method according to an embodiment of this application. As shown in FIG. 2, the method may include the following step.

S201. An access network device sends at least one precoding configuration to a terminal device.

The at least one precoding configuration is carried in any downlink information such as a radio resource control (Radio Resource Control, RRC for short) message, a media access control (Media Access Control, MAC for short) message, or downlink control information (Downlink Control Information, DCI for short).

The access network device may send the at least one precoding configuration to the terminal device in a broadcast, multicast, or unicast manner. Each precoding configuration may include a plurality of parameters for multi-antenna transmission. Because the access network device knows a transmission capability of the terminal device that communicates with the access network device, the access network device may configure the at least one precoding configuration for the terminal device based on the transmission capability of the terminal device. The transmission capability of the terminal device may usually include a maximum quantity of transmission antenna ports, a maximum quantity of transport layers, a coherent capability between antenna ports, and the like that are supported by the terminal device. Therefore, each precoding configuration may include configuration parameters corresponding to various transmission capabilities of the terminal device.

In an example, each precoding configuration includes at least one of the following parameters: a sounding reference signal resource indicator (Sounding Reference Signal resource Indicator, SRI for short), a transmission rank indicator (Transmission Rank Indicator, TRI for short), a transmitted precoding matrix indicator (Transmission Precoder Matrix Indicator, TPMI for short), and the like.

The information transmission method provided in this embodiment of this application may be applicable to different multi-antenna transmission modes. Based on the different multi-antenna transmission modes, each precoding configuration may include information of different types.

For example, if a transmission mode is a codebook-based multi-antenna transmission mode, each precoding configuration may include the SRI, the TRI, and the TPMI.

The SRI may be used to indicate a sounding reference signal (Sounding Reference Signal, SRS for short) resource, and implicitly or indirectly indicate an antenna port used by the terminal device to perform uplink transmission, for example, an antenna port used for sending an SRS on the SRS resource indicated by the SRI. The TRI may be used to indicate a quantity of layers used by the terminal device to perform the uplink transmission. The TPMI may be used to indicate a precoding matrix used when the terminal device performs the uplink transmission. The SRI may be used to indicate that in the codebook-based multi-antenna transmission mode, the precoding matrix indicated by the TPMI may be a precoding matrix in a preset codebook set.

If a transmission mode is a non-codebook-based multi-antenna transmission mode, each precoding configuration may include the SRI.

In the non-codebook multi-antenna transmission mode, the SRI may be used to indicate an SRS resource, and implicitly or indirectly indicate an antenna port and a precoding matrix that are used by the terminal device to perform uplink transmission, for example, an antenna port and a precoding matrix that are used and that are the same as those used when an SRS is last sent on the SRS resource indicated by the SRI. In the non-codebook multi-antenna transmission mode, the precoding matrix indirectly indicated by the SRI may not be limited to a precoding matrix in a preset codebook set (for example, a codebook set specified in a standard protocol), or may be a precoding matrix outside the preset codebook set.

Correspondingly, the method may further include the following steps.

S202. The terminal device receives the at least one precoding configuration from the access network device.

After obtaining the at least one precoding configuration, the terminal device further determines, based on the transmission capability supported by the terminal device, and each precoding configuration, whether the transmission capability corresponding to each precoding configuration falls in the transmission capability supported by the terminal device. If the transmission capability corresponding to each precoding configuration falls in the transmission capability supported by the terminal device, an information transmission method in the following embodiments of this application may be performed based on the at least one precoding configuration, to transmit uplink information. On the contrary, if the transmission capability corresponding to each precoding configuration is beyond the transmission capability supported by the terminal device, it may be determined that each precoding configuration is an incorrect precoding configuration, and the information transmission method in the following embodiments of this application does not need to be performed based on the at least one precoding configuration.

S203. The terminal device starts a timer (Start Timer).

Valid duration of the timer may be a preset time period (for example, duration specified in a standard protocol), or may be duration configured by the access network device or another network device.

The terminal device may start the timer when or after receiving the at least one precoding configuration. In other words, starting of the timer may be triggered by an operation of receiving the at least one precoding configuration. In another implementation, the terminal device starts the timer based on a received start indication of the timer. For example, the access network device sends the start indication of the timer and the at least one precoding configuration together to the terminal device, and the terminal device starts the timer based on the received start indication of the timer. The start indication of the timer may be only information that triggers to start the timer, or may include information that indicates a start time of the timer and/or information that indicates the valid duration of the timer.

S204. The terminal device sends the uplink information to the access network device on a configured grant-free (Grant Free) time-frequency resource in the valid duration of the timer by using the at least one precoding configuration.

The grant-free time-frequency resource is a time-frequency resource that is configured by the access network device for the terminal device and that can be used for uplink grant-free transmission. Grant-free transmission may also be referred to as transmission without dynamic grant (uplink transmission without dynamic grant), and includes grant-free transmission of two types. For a first-type grant-free transmission, the grant-free time-frequency resource is configured and activated/deactivated based on an RRC message. For a second-type grant-free transmission, the grant-free time-frequency resource is configured based on the RRC message and DCI, or may be modified based on DCI.

The valid duration of the timer may also be referred to as an effective period of the timer.

In an implementable manner, in the valid duration of the timer, when needing to transmit uplink data, the terminal device may send the uplink information such as the uplink data to the access network device on the grant-free time-frequency resource by using the at least one precoding configuration.

In another implementable manner, in the valid duration of the timer, when needing to transmit another piece of uplink information, the terminal device may further send the another piece of uplink information to the access network device on the grant-free time-frequency resource by using the at least one precoding configuration.

Regardless of which uplink information that is sent, because the uplink information is transmitted on the grant-free time-frequency resource, when the terminal device sends the uplink information to the access network device by using the at least one precoding configuration, it may be considered that transmission of the uplink information is the uplink grant-free transmission.

Correspondingly, the method may further include the following step.

S205. The access network device receives the uplink information from the terminal device on the grant-free time-frequency resource.

According to the information processing method provided in this embodiment of this application, the terminal device may receive the at least one precoding configuration of the access network device, start the timer, and send the uplink information to the access network device on the configured grant-free time-frequency resource in the valid duration of the timer by using the at least one precoding configuration. In the method, use duration of a precoding configuration is limited by using the valid duration of the timer, and the uplink information is sent on the grant-free time-frequency resource by using the at least one precoding configuration. Therefore, a precoding configuration used for transmitting the uplink information on the grant-free time-frequency resource is flexible and variable, so that inadaptation of a precoding configuration caused by a channel change is effectively avoided, thereby improving system performance.

Figure 3:
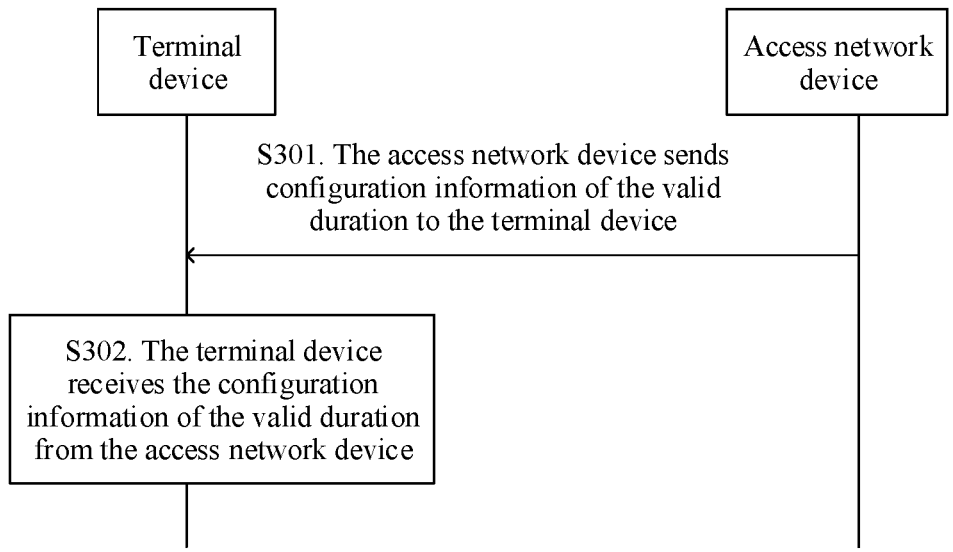
FIG. 3 is a flowchart 2 of an information transmission method according to an embodiment of this application.

For example, the duration of the timer may be the duration configured by the access network device. FIG. 3 is a flowchart 2 of an information transmission method according to an embodiment of this application. As shown in FIG. 3, on the basis of the foregoing embodiment, the information transmission method may further include the following steps.

S301. The access network device sends configuration information of the valid duration to the terminal device.

The configuration information of the valid duration may be carried in any downlink message such as the RRC message, a MAC message, or the DCI.

The configuration information of the valid duration and the at least one precoding configuration in the foregoing embodiment may be located in a same downlink message, or may be located in different downlink messages. In other words, S301 and S201 may be simultaneously performed, or may be successively performed. For example, if both the configuration information of the valid duration and the at least one precoding configuration are in the RRC message, S301 and S201 may be simultaneously performed. If both the configuration information of the valid duration and the at least one precoding configuration are located in different messages, S301 and S201 may be successively performed.

S302. The terminal device receives the configuration information of the valid duration from the access network device.

Regardless of a performing sequence between S301 and S201, S302 needs to be performed before S203.

The access network device configures the valid duration of the timer. Therefore, the valid duration of the timer can be more flexible, and the use duration of the precoding configuration is more flexible, so that the inadaptation of the precoding configuration caused by the channel change is effectively avoided, thereby improving the system performance.

For example, the at least one precoding configuration may be included by the access network device in configuration information used for the grant-free transmission. For the first-type grant-free transmission, the configuration information of the grant-free transmission may include, for example, grant-free configuration information defined by a configuration item ConfiguredGrantConfig in the 3GPP TS38.331 standard. The grant-free configuration information may include a modulation and coding scheme (Modulation and Coding Scheme, MCS for short) information, power control information, time-frequency resource information, pilot configuration information, and the like.

For the second-type grant-free transmission, the configuration information of the grant-free transmission includes grant-free configuration information defined in the configuration item ConfiguredGrantConfig and configuration information defined in the DCI. The configuration information defined in the DCI is the same as configuration information defined in a sub-configuration item rrc-ConfiguredUplinkGrant in the configuration item ConfiguredGrantConfig used to configure the first-type grant-free transmission. The configuration information in the configuration item ConfiguredGrantConfig used to configure the second-type grant-free transmission is configuration information that is other than the sub-configuration item rrc-ConfiguredUplinkGrant and that is in the configuration item ConfiguredGrantConfig used to configure the first-type grant-free transmission. The at least one precoding configuration in this embodiment of this application may be included only in the configuration item ConfiguredGrantConfig used to configure the second-type grant-free transmission, or may be included only in the DCI used to configure the second-type grant-free transmission. Alternatively, some information in a precoding configuration may be included in the configuration item ConfiguredGrantConfig used to configure the second-type grant-free transmission, and other information in the precoding configuration is included in the DCI used to configure the second-type grant-free transmission.

Figure 4:
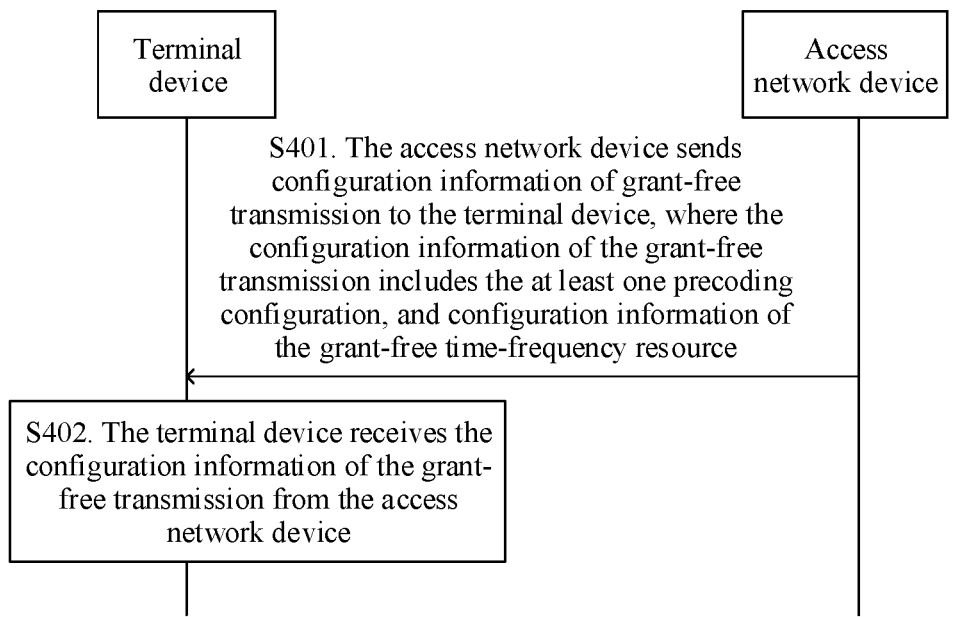
FIG. 4 is a flowchart 3 of an information transmission method according to an embodiment of this application.

FIG. 4 is a flowchart 3 of an information transmission method according to an embodiment of this application. The access network device sends the at least one precoding configuration to the terminal device in S201 in the method shown above, and the following step may be included as shown in FIG. 4.

S401. The access network device sends configuration information of grant-free transmission to the terminal device, where the configuration information of the grant-free transmission includes the at least one precoding configuration, and configuration information of the grant-free time-frequency resource.

For uplink grant-free transmission, the information transmission method provided in this embodiment of this application may be applied to a first-type grant-free transmission mode, or may be applied to a second-type grant-free transmission mode.

If the method is applied to the first-type grant-free transmission mode, the access network device may configure, based on an RRC message, grant information (UL Grant) required by the terminal device to perform uplink grant-free transmission. The grant information required by the terminal device to perform the uplink grant-free transmission may be configured by using the configuration information of the grant-free transmission. In other words, the configuration information of the grant-free transmission in S401 may be located in the RRC message.

If the method is applied to the second-type grant-free transmission mode, the access network device may configure, based on an RRC message, some configuration information required by the terminal device to perform uplink grant-free transmission, and configure, based on DCI, other configuration information required by the terminal device to perform the uplink grant-free transmission. That is, in this example, some of the configuration information of the grant-free transmission in S401 is located in the RRC message, and other configuration information is located in the DCI.

Certainly, the information transmission method may be further applied to an another-type grant-free mode, and the configuration information of the grant-free transmission may alternatively be located in another message. The foregoing description is merely an example, and details are not described herein again.

Correspondingly, the method may further include the following step.

S402. The terminal device receives the configuration information of the grant-free transmission from the access network device.

Optionally, the configuration information of the grant-free transmission shown above may further include configuration information of the valid duration.

To be specific, both the at least one precoding configuration, and the configuration information of the valid duration may be located in a same message such as the RRC message. If the at least one precoding configuration, and the configuration information of the valid duration are located in the same message, the at least one precoding configuration, and the configuration information of the valid duration may be located in different fields of the same message.

There may be one or more precoding configurations.

In an example, if there is one precoding configuration, the terminal device may send uplink information to the access network device on the configured grant-free time-frequency resource in the valid duration of the timer by using the precoding configuration.

In another example, there are a plurality of precoding configurations. For the plurality of precoding configurations, in a possible implementation, the terminal device may traverse the precoding configurations based on a preset granularity of a frequency domain resource unit, to determine a precoding configuration of each frequency domain resource unit of the grant-free time-frequency resource.

Figure 5:
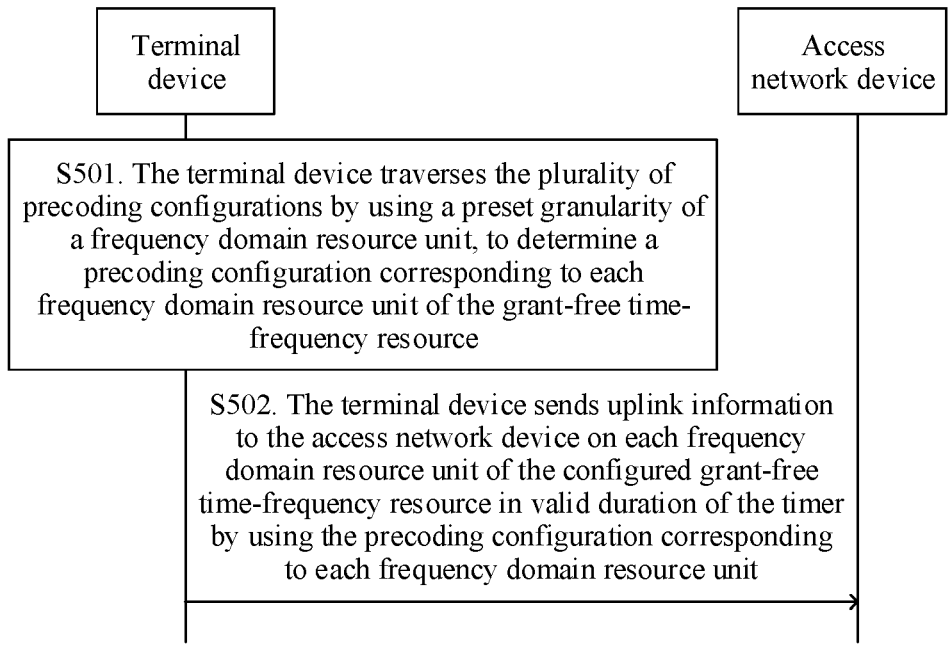
FIG. 5 is a flowchart 4 of an information transmission method according to an embodiment of this application.

FIG. 5 is a flowchart 4 of an information transmission method according to an embodiment of this application. As shown in FIG. 5, before the terminal device sends the uplink information to the access network device on the configured grant-free time-frequency resource in the valid duration of the timer by using the at least one precoding configuration in S204 shown above, the information transmission method may further include the following step.

S501. The terminal device traverses the plurality of precoding configurations by using a preset granularity of a frequency domain resource unit, to determine a precoding configuration corresponding to each frequency domain resource unit of the grant-free time-frequency resource.

Two adjacent frequency domain resource units in the grant-free time-frequency resource correspond to different precoding configurations.

The plurality of precoding configurations are traversed by using the preset granularity of the frequency domain resource unit, so that precoding configurations corresponding to all frequency domain resource units of the grant-free time-frequency resource include all the plurality of precoding configurations. Because a quantity of the precoding configurations may be different from a quantity of the frequency domain resource units included in the grant-free time-frequency resource, different frequency domain resource units in the grant-free time-frequency resource may correspond to a same precoding configuration, provided that two adjacent frequency domain resources correspond to different precoding configurations.

In this embodiment, the granularity of the frequency domain resource unit includes, for example, any one of the following: a resource block (Resource Block, RB for short) and a precoding resource block group (Precoding Resource Block Group, PRG for short).

The following provides description by using an example in which the precoding configurations are traversed by using one RB as the granularity of the frequency domain resource unit.

For example, in a codebook-based transmission mode, each of the plurality of precoding configurations may include {SRI, TRI, TPMI}, the grant-free time-frequency resource includes a plurality of frequency domain resource units, each frequency domain resource unit may be one RB, and the plurality of frequency domain resource units may be represented as RBs {0, 1, ... }. According to S501, it may be learned that a precoding configuration corresponding to the RB 0 is the first precoding configuration, a precoding configuration corresponding to the RB 1 is the second precoding configuration, and a precoding configuration corresponding to the RB 2 is the third precoding configuration. By analogy, a precoding configuration corresponding to an RB i is a $j^{th}$ precoding configuration, where $j=\mod(i, N)+1$, mod( ) is a modulo function, and N is the quantity of the precoding configurations.

In a non-codebook-based transmission mode, each of the plurality of precoding configurations may include {SRI}, the grant-free time-frequency resource includes a plurality of frequency domain resource units, each frequency domain resource unit may be one RB, and the plurality of frequency domain resource units may be represented as RBs {0, 1, ... }. According to S501, it may be learned that a precoding configuration corresponding to the RB 0 is the first precoding configuration, a precoding configuration corresponding to the RB 1 is the second precoding configuration, and a precoding configuration corresponding to the RB 2 is the third precoding configuration. By analogy, a precoding configuration corresponding to an RB i is a $j^{th}$ precoding configuration, where $j=\mod(i, N)+1$, mod( ) is a modulo function, and N is the quantity of the precoding configurations.

The foregoing example is described by using one RB as a frequency domain resource unit. A specific implementation of traversing the precoding configurations by using one PRG as a frequency domain resource unit may be similar to the foregoing case in which the RB is used as the frequency domain resource unit. For details, refer to the foregoing description. Details are not described herein again.

That the terminal device sends the uplink information to the access network device on the configured grant-free time-frequency resource in the valid duration of the timer by using the at least one precoding configuration in S204 shown above includes the following step.

S502. The terminal device sends the uplink information to the access network device on each frequency domain resource unit of the configured grant-free time-frequency resource in the valid duration of the timer by using the precoding configuration corresponding to each frequency domain resource unit.

According to the information transmission method provided in this embodiment of this application, the terminal device may traverse the plurality of precoding configurations based on the preset granularity of the frequency domain resource unit, to determine the precoding configuration corresponding to each frequency domain resource unit of the grant-free time-frequency resource, thereby ensuring flexibility of precoding configurations of different frequency domain resource units. In addition, the uplink information is transmitted on each frequency domain resource unit based on the precoding configuration corresponding to each frequency domain resource unit, so that a diversity gain of the terminal device can be effectively increased.

For the plurality of precoding configurations, in another possible implementation, the terminal device may traverse the precoding configurations based on a preset granularity of a time-domain resource unit, to determine a precoding configuration of each time-domain resource unit of the grant-free time-frequency resource.

Figure 6:
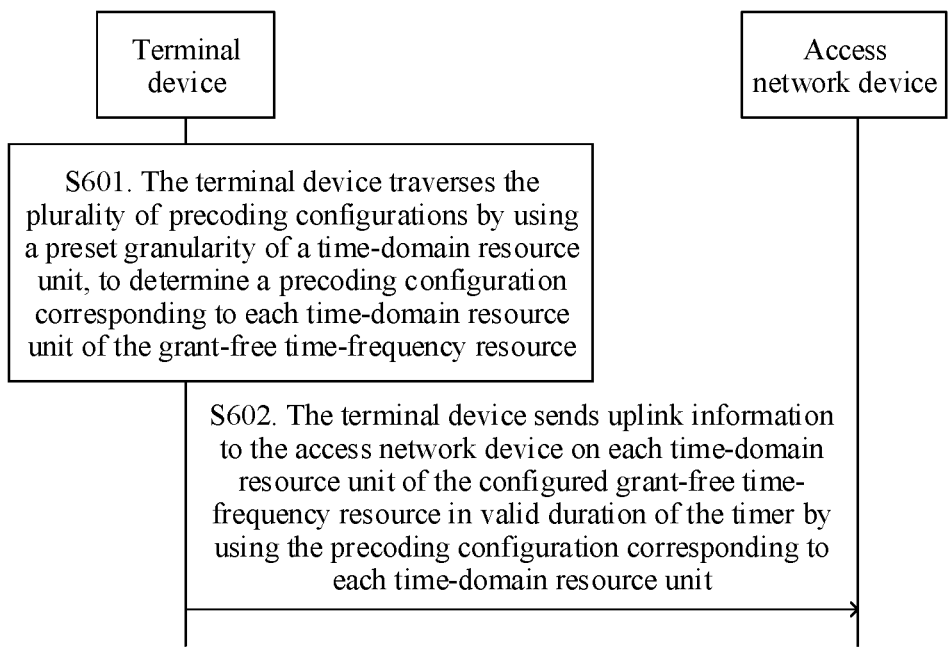
FIG. 6 is a flowchart 5 of an information transmission method according to an embodiment of this application.

FIG. 6 is a flowchart 5 of an information transmission method according to an embodiment of this application. As shown in FIG. 6, before the terminal device sends the uplink information to the access network device on the configured grant-free time-frequency resource in the valid duration of the timer by using the at least one precoding configuration in S204 shown above, the information transmission method may further include the following step.

S601. The terminal device traverses the plurality of precoding configurations by using a preset granularity of a time-domain resource unit, to determine a precoding configuration corresponding to each time-domain resource unit of the grant-free time-frequency resource.

Two adjacent time-domain resource units in the grant-free time-frequency resource correspond to different precoding configurations.

The plurality of precoding configurations are traversed by using the preset granularity of the time-domain resource unit, so that precoding configurations corresponding to all time-domain resource units of the grant-free time-frequency resource include all the plurality of precoding configurations. Because a quantity of the precoding configurations may be different from a quantity of the time-domain resource units included in the grant-free time-frequency resource, different time-domain resource units in the grant-free time-frequency resource may correspond to a same precoding configuration, provided that two adjacent time-domain resources correspond to different precoding configurations.

A time domain granularity of the time-domain resource unit may be a time length of a time-domain resource corresponding to one transmission. Because the uplink information is transmitted on the grant-free time-frequency resource, one transmission may also be referred to as one grant-free transmission. At least one grant-free transmission may be performed on the configured grant-free time-frequency resource, and the time domain granularity of the time-domain resource unit may be the time length of the time-domain resource corresponding to the grant-free transmission.

The following provides description by using an example in which the precoding configurations are traversed by using the length of the time-domain resource corresponding to the transmission, as a time-domain resource unit.

For example, in a codebook-based transmission mode, each of the plurality of precoding configurations may include {SRI, TRI, TPMI}, the grant-free time-frequency resource includes a plurality of time-domain resource units, and a length of each time-domain resource unit may be a length of a resource for the grant-free transmission. According to S601, it may be learned that a precoding configuration corresponding to the first grant-free transmission is the first precoding configuration, a precoding configuration corresponding to the second grant-free transmission is the second precoding configuration, and a precoding configuration corresponding to the third grant-free transmission is the third precoding configuration. By analogy, a precoding configuration corresponding to an ith grant-free transmission is a $j^{th}$ precoding configuration, where j=mod(i, N), mod( ) is a modulo function, and N is the quantity of the precoding configurations.

In a non-codebook-based transmission mode, each of the plurality of precoding configurations may include {SRI}, the grant-free time-frequency resource includes a plurality of time-domain resource units, and a length of each time-domain resource unit may be the length of the time-domain resource for the grant-free transmission. According to S601, it may be learned that a precoding configuration corresponding to the first grant-free transmission is the first precoding configuration, a precoding configuration corresponding to the second grant-free transmission is the second precoding configuration, and a precoding configuration corresponding to the third grant-free transmission is the third precoding configuration. By analogy, a precoding configuration corresponding to an RB i is a $j^{th}$ precoding configuration, where j=mod(i, N), mod( ) is a modulo function, and N is the quantity of the precoding configurations.

In the foregoing example, the length of the resource corresponding to the grant-free transmission is used as the time-domain resource unit for description. For a specific implementation of traversing the precoding configurations based on an another-type time-domain resource unit, refer to the foregoing description. Details are not described herein again.

That the terminal device sends the uplink information to the access network device on the configured grant-free time-frequency resource in the valid duration of the timer by using the at least one precoding configuration in S204 shown above includes the following step.

S602. The terminal device sends the uplink information to the access network device on each time-domain resource unit of the configured grant-free time-frequency resource in the valid duration of the timer by using the precoding configuration corresponding to each time-domain resource unit.

According to the information transmission method provided in this embodiment of this application, the terminal device may traverse the plurality of precoding configurations based on the preset time-domain resource unit, to determine the precoding configuration of each time-domain resource unit of the grant-free time-frequency resource, thereby ensuring flexibility of precoding configurations of different time-domain resource units, so that inadaptation of a precoding configuration caused by a channel change is effectively avoided, thereby improving system performance. In addition, the uplink information is transmitted on each time-domain resource unit based on the precoding configuration corresponding to each time-domain resource unit, so that a diversity gain of the terminal device can be effectively increased.

Because the timer has specific valid duration, after the valid duration of the timer expires or before the timer is started, the timer may be considered to be invalid. In addition, if the valid duration of the timer has not expired, because the terminal device receives a new precoding configuration configured by the access network device, the terminal device restarts the timer, and sends the uplink information to the access network device on the configured grant-free time-frequency resource by using the new precoding configuration. Once the timer is invalid, the terminal device may release the precoding configuration configured by the access network device, and perform uplink transmission by using a preset precoding configuration. The preset precoding configuration may be specified in a standard, or may be configured, together with another precoding configuration, by the access network device in step S201, or may be configured by the access network device before step S201. This embodiment of this application may further provide a plurality of implementations that may be implemented when the timer is in the invalid state.

In an implementation, the information transmission method may further include:

if the timer is invalid, sending, by the terminal device, the uplink information to the access network device on the configured grant-free time-frequency resource by using the preset precoding configuration.

The preset precoding configuration may be a preset precoding configuration corresponding to a single antenna. In other words, if the timer is invalid, the terminal device may send the uplink information to the access network device on the configured grant-free time-frequency resource in a single-antenna transmission mode.

In another implementation, the information transmission method may further include:

if the timer is invalid, traversing a plurality of preset precoding configurations by using a preset granularity of a frequency domain resource unit, to determine a precoding configuration corresponding to each frequency domain resource unit of the grant-free time-frequency resource, where two adjacent frequency domain resource units in the grant-free time-frequency resource correspond to different precoding configurations.

The granularity of the frequency domain resource unit may be, for example, an RB or a PRB.

The following provides description by using an example in which the precoding configurations are traversed by using one RB as the granularity of the frequency domain resource unit.

For example, for a codebook-based transmission mode, the following Table 1 is a codebook for single-layer transmission on two antenna ports, and a precoding matrix index in Table 1 may be a TPMI index.

TABLE 1

| Precoding matrix index | Precoding matrix (Sequencing in ascending order of precoding matrix indexes from left to right) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

In an example, if the terminal device supports a maximum of two antenna ports, and supports only non-coherent transmission, namely, the single-layer transmission, precoding matrices indicated by the plurality of preset precoding configurations may include the precoding matrices corresponding to the precoding matrix indexes 0 and 1 in Table 1.

Figure 7A:
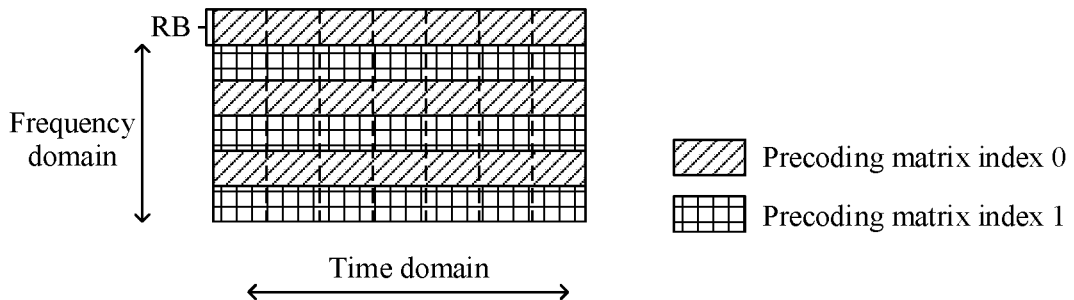
FIG. 7A is a diagram 1 of a correspondence that is between each RB of a grant-free time-frequency resource in frequency domain and a precoding matrix and that is in an information transmission method according to an embodiment of this application.

FIG. 7A is a diagram 1 of a correspondence that is between each RB of a grant-free time-frequency resource in frequency domain and a precoding matrix and that is in an information transmission method according to an embodiment of this application. As shown in FIG. 7A, the grant-free time-frequency resource may include a plurality of RBs in frequency domain, and the RBs may be represented as RBs {0, 1, . . . }. A precoding matrix indicated by a precoding configuration corresponding to the RB 0 is a precoding matrix corresponding to the precoding matrix index 0, a precoding matrix indicated by a precoding configuration corresponding to the RB 1 is a precoding matrix corresponding to the precoding matrix index 1, and a precoding matrix indicated by a precoding configuration corresponding to the RB 2 is a precoding matrix corresponding to the precoding matrix index 0. By analogy, a precoding matrix indicated by a precoding configuration corresponding to an RB i is a precoding matrix corresponding to a precoding matrix index j, where j=mod(i, 2), and mod( ) is a modulo function.

In another example, if the terminal device supports a maximum of two antenna ports, and supports full coherent transmission, for the single-layer transmission, precoding matrices indicated by the plurality of preset precoding configurations may include a precoding matrix of any subset of the codebook set in Table 1.

The following uses an example in which the precoding matrices indicated by the plurality of precoding configurations include the precoding matrices corresponding to the precoding matrix indexes 2 to 5 in Table 1 for description. Certainly, the precoding matrices indicated by the plurality of precoding configurations may alternatively be precoding matrices in another subset of the codebook set in Table 1.

Figure 7B:
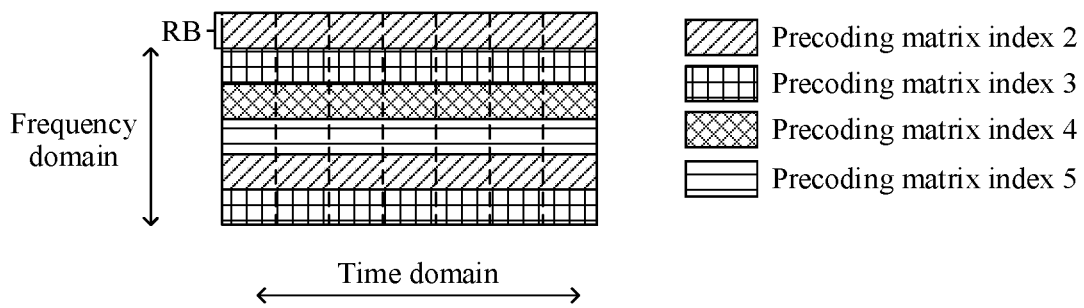
FIG. 7B is a diagram 2 of a correspondence that is between each RB of a grant-free time-frequency resource in frequency domain and a precoding matrix and that is in an information transmission method according to an embodiment of this application.

FIG. 7B is a diagram 2 of a correspondence that is between each RB of a grant-free time-frequency resource in frequency domain and a precoding matrix and that is in an information transmission method according to an embodiment of this application. As shown in FIG. 7B, the grant-free time-frequency resource may include a plurality of RBs in frequency domain, and the RBs may be represented as RBs {0, 1, . . . }. A precoding matrix indicated by a precoding configuration corresponding to the RB 0 is a precoding matrix corresponding to the precoding matrix index 2, a precoding matrix indicated by a precoding configuration corresponding to the RB 1 is a precoding matrix corresponding to the precoding matrix index 3, and a precoding matrix indicated by a precoding configuration corresponding to the RB 2 is a precoding matrix corresponding to the precoding matrix index 4. By analogy, a precoding matrix indicated by a precoding configuration corresponding to an RB i is a precoding matrix corresponding to a precoding matrix index j, where j=mod(i, 4)+2, and mod( ) is a modulo function.

For another example, for a codebook-based transmission mode, the following Table 2 is a codebook for single-layer transmission on four antenna ports, and a precoding matrix index in Table 2 may be a TPMI index.

Table 2

TABLE 2

| Precoding matrix index | Precoding matrix (Sequencing in ascending order of precoding matrix indexes from left to right) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |

TABLE 2-continued

| Precoding matrix index | Precoding matrix (Sequencing in ascending order of precoding matrix indexes from left to right) |
| --- | --- |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

In an example, if the terminal device supports a maximum of four antenna ports, and supports only non-coherent transmission, precoding matrices indicated by the plurality of preset precoding configurations may include the precoding matrices corresponding to the precoding matrix indexes 0 to 3 in Table 2.

Figure 7C:
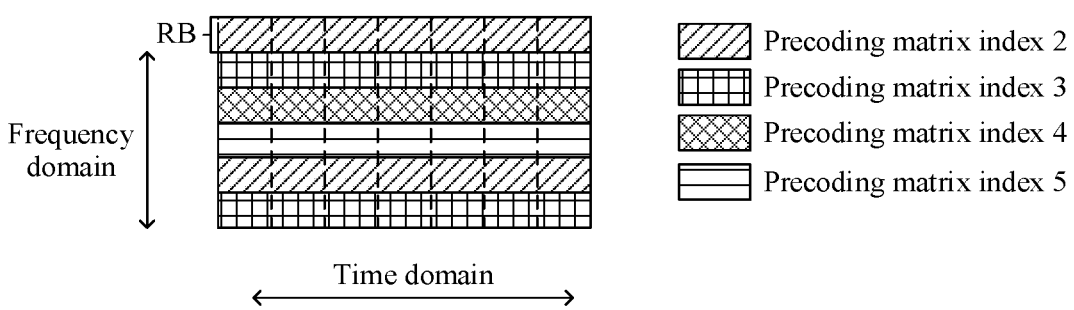
FIG. 7C is a diagram 3 of a correspondence that is between each RB of a grant-free time-frequency resource in frequency domain and a precoding matrix and that is in an information transmission method according to an embodiment of this application.

FIG. 7C is a diagram 3 of a correspondence that is between each RB of a grant-free time-frequency resource in frequency domain and a precoding matrix and that is in an information transmission method according to an embodiment of this application. As shown in FIG. 7C, the grant-free time-frequency resource may include a plurality of RBs in frequency domain, and the RBs may be represented as RBs {0, 1, . . . }. A precoding matrix indicated by a precoding configuration corresponding to the RB 0 is a precoding matrix corresponding to the precoding matrix index 0, a precoding matrix indicated by a precoding configuration corresponding to the RB 1 is a precoding matrix corresponding to the precoding matrix index 1, and a precoding matrix indicated by a precoding configuration corresponding to the RB 2 is a precoding matrix corresponding to the precoding matrix index 2. By analogy, a precoding matrix indicated by a precoding configuration corresponding to an RB i is a precoding matrix corresponding to a precoding matrix index j, where j=mod(i, 4), and mod( ) is a modulo function.

In another example, if the terminal device supports a maximum of four antenna ports, and supports partially coherent transmission, for single-layer transmission, an example in which precoding matrices indicated by the plurality of preset precoding configurations may include the precoding matrices corresponding to the precoding matrix indexes 4 to 7 in Table 2 is used for description. Certainly, the precoding matrices indicated by the plurality of precoding configurations may alternatively be precoding matrices in another subset of the precoding matrix indexes 0 to 7 in Table 2.

Figure 7D:
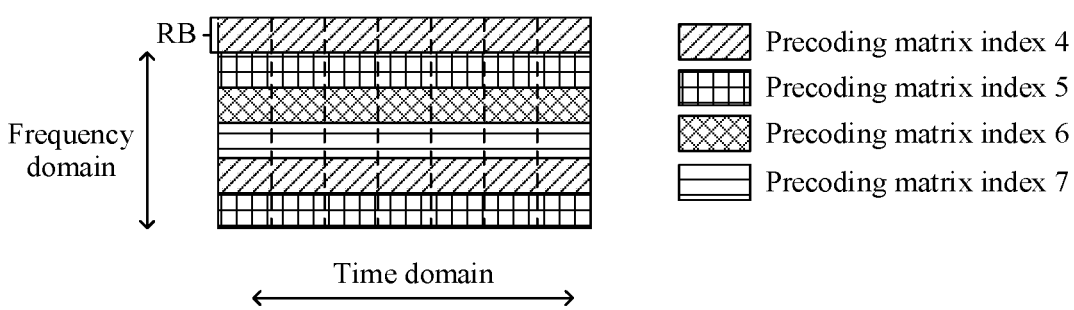
FIG. 7D is a diagram 4 of a correspondence that is between each RB of a grant-free time-frequency resource in frequency domain and a precoding matrix and that is in an information transmission method according to an embodiment of this application.

FIG. 7D is a diagram 4 of a correspondence that is between each RB of a grant-free time-frequency resource in frequency domain and a precoding matrix and that is in an information transmission method according to an embodiment of this application. As shown in FIG. 7D, the grant-free time-frequency resource may include a plurality of RBs in frequency domain, and the RBs may be represented as RBs {0, 1, . . . }. A precoding matrix indicated by a precoding configuration corresponding to the RB 0 is a precoding matrix corresponding to the precoding matrix index 4, a precoding matrix indicated by a precoding configuration corresponding to the RB 1 is a precoding matrix corresponding to the precoding matrix index 5, and a precoding matrix indicated by a precoding configuration corresponding to the RB 2 is a precoding matrix corresponding to the precoding matrix index 6. By analogy, a precoding matrix indicated by a precoding configuration corresponding to an RB i is a precoding matrix corresponding to a precoding matrix index j, where j=mod(i, 4)+4, and mod( ) is a modulo function.

In still another example, if the terminal device supports a maximum of four antenna ports, and supports full coherent transmission, for single-layer transmission, precoding matrices indicated by the plurality of preset precoding configurations may include a precoding matrix of any subset of all the precoding matrices in Table 2.

The following uses an example in which the precoding matrices indicated by the plurality of precoding configurations include the precoding matrices corresponding to the precoding matrix index 12, the precoding matrix index 14, the precoding matrix index 20, and the precoding matrix index 22 in Table 2 for description. Certainly, the precoding matrices indicated by the plurality of precoding configurations may alternatively be precoding matrices in another subset of a set of all the precoding matrices in Table 2.

Figure 7E:
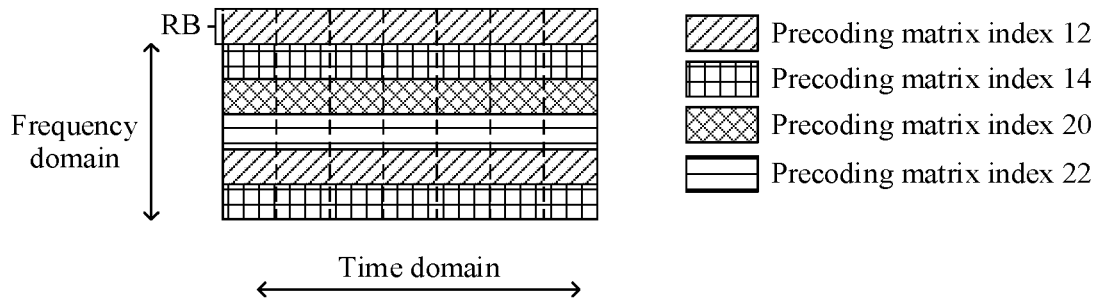
FIG. 7E is a diagram 5 of a correspondence that is between each RB of a grant-free time-frequency resource in frequency domain and a precoding matrix and that is in an information transmission method according to an embodiment of this application.

FIG. 7E is a diagram 5 of a correspondence that is between each RB of a grant-free time-frequency resource in frequency domain and a precoding matrix and that is in an information transmission method according to an embodiment of this application. As shown in FIG. 7E, the grant-free time-frequency resource may include a plurality of RBs in frequency domain, and the RBs may be represented as RBs {0, 1, . . . }. A precoding matrix indicated by a precoding configuration corresponding to the RB 0 is a precoding matrix corresponding to the precoding matrix index 12, a precoding matrix indicated by a precoding configuration corresponding to the RB 1 is a precoding matrix corresponding to the precoding matrix index 14, and a precoding matrix indicated by a precoding configuration corresponding to the RB 2 is a precoding matrix corresponding to the precoding matrix index 20. By analogy, a precoding matrix indicated by a precoding configuration corresponding to an RB i is a precoding matrix corresponding to a $j^{th}$ precoding configuration, where j=mod(i, 4), and mod( ) is a modulo function. For example, a precoding matrix indicated by the zeroth precoding configuration may be the precoding matrix corresponding to the precoding matrix index 12, a precoding matrix indicated by the first precoding configuration may be the precoding matrix corresponding to the precoding matrix index 14, a precoding matrix indicated by the second precoding configuration may be the precoding matrix corresponding to the precoding matrix index 20, and a precoding matrix indicated by the third precoding configuration may be a precoding matrix corresponding to the precoding matrix index 22.

Corresponding to a non-codebook-based transmission mode, the following uses an example in which the plurality of preset precoding configurations include an SRI 0, an SRI 1, an SRI 2, and an SRI 3 for description. Certainly, the plurality of precoding configurations may further include other information.

Figure 7F:
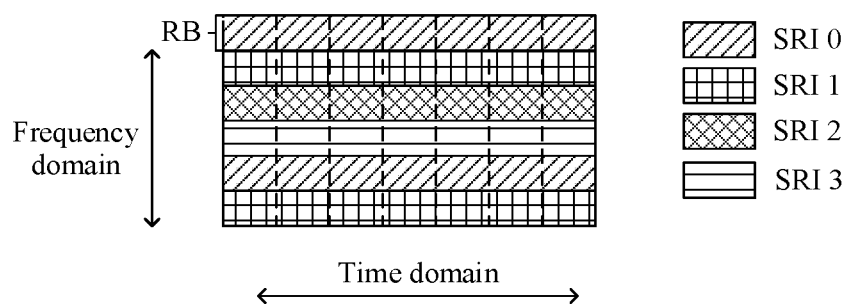
FIG. 7F is a diagram 6 of a correspondence that is between each RB of a grant-free time-frequency resource in frequency domain and a precoding matrix and that is in an information transmission method according to an embodiment of this application.

FIG. 7F is a diagram 6 of a correspondence that is between each RB of a grant-free time-frequency resource in frequency domain and a precoding matrix and that is in an information transmission method according to an embodiment of this application. As shown in FIG. 7F, the grant-free time-frequency resource may include a plurality of RBs in frequency domain, and the RBs may be represented as RBs {0, 1, . . . }. A precoding configuration corresponding to the RB 0 is the SRI 0, a precoding configuration corresponding to the RB 1 is the SRI 1, and a precoding configuration corresponding to the RB 2 is the SRI 2. By analogy, a precoding configuration corresponding to an RB i is an SRI j, where j=mod(i, 4), and mod( ) is a modulo function.

The foregoing example is described by using one RB as the granularity of the frequency domain resource unit. A specific implementation of traversing the precoding configurations by using one PRG as the granularity of the frequency domain resource unit may be similar to the foregoing case in which the RB is used as the granularity of the frequency domain resource unit. For details, refer to the foregoing description. Details are not described herein again.

In still another implementation, the information transmission method may further include:

if the timer is invalid, traversing a plurality of preset precoding configurations by using a preset granularity of the time-domain resource unit, to determine a precoding configuration corresponding to each time-domain resource unit of the grant-free time-frequency resource, where two adjacent frequency domain resource units in the grant-free time-frequency resource correspond to different precoding configurations.

The granularity of the time-domain resource unit may be, for example, the time length of the time-domain resource corresponding to the transmission.

The following provides description by using an example in which the precoding configurations are traversed by using the length of the time-domain resource corresponding to the transmission, as the granularity of the frequency domain resource unit.

For example, for a codebook-based transmission mode, the following uses an example in which precoding matrices indicated by the plurality of preset precoding configurations include the precoding matrices corresponding to the precoding matrix index 12, the precoding matrix index 14, the precoding matrix index 20, and the precoding matrix index 22 in Table 2 for description. Certainly, the precoding matrices indicated by the plurality of preset precoding configurations may alternatively be precoding matrices in another subset of a set of all the codebooks in Table 2.

Figure 8A:
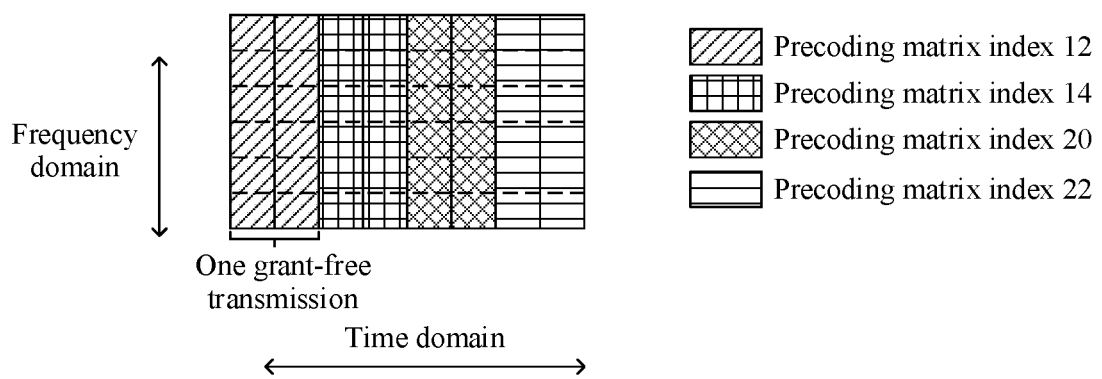
FIG. 8A is a diagram 1 of a correspondence that is between each time-domain resource unit of a grant-free time-frequency resource and a precoding matrix and that is in an information transmission method according to an embodiment of this application.

FIG. 8A is a diagram 1 of a correspondence that is between each time-domain resource unit of a grant-free time-frequency resource and a precoding matrix and that is in an information transmission method according to an embodiment of this application. As shown in FIG. 8A, the grant-free time-frequency resource includes the plurality of time-domain resource units, and the length of each time-domain resource unit is the length of the time-domain resource corresponding to the grant-free transmission. A precoding matrix indicated by a precoding configuration corresponding to the first grant-free transmission is the precoding matrix corresponding to the precoding matrix index 12, a precoding matrix indicated by a precoding configuration corresponding to the second grant-free transmission is the precoding matrix corresponding to the precoding matrix index 14, and a precoding matrix indicated by a precoding configuration corresponding to the third grant-free transmission is the precoding matrix corresponding to the precoding matrix index 20. By analogy, a precoding matrix indicated by a precoding configuration corresponding to an grant-free transmission is a precoding matrix corresponding to a $j^{th}$ precoding configuration, where j=mod(i, 4).

A precoding matrix indicated by the zeroth precoding configuration may be the precoding matrix corresponding to the precoding matrix index 12, a precoding matrix indicated by the first precoding configuration may be the precoding matrix corresponding to the precoding matrix index 14, a precoding matrix indicated by the second precoding configuration may be the precoding matrix corresponding to the precoding matrix index 20, and a precoding matrix indicated by the third precoding configuration may be a precoding matrix corresponding to the precoding matrix index 22. Corresponding to the non-codebook-based transmission mode, the following uses an example in which the plurality of preset precoding configurations include an SRI 0, an SRI 1, an SRI 2, and an SRI 3 for description. Certainly, the plurality of precoding configurations may further include other information.

Figure 8B:
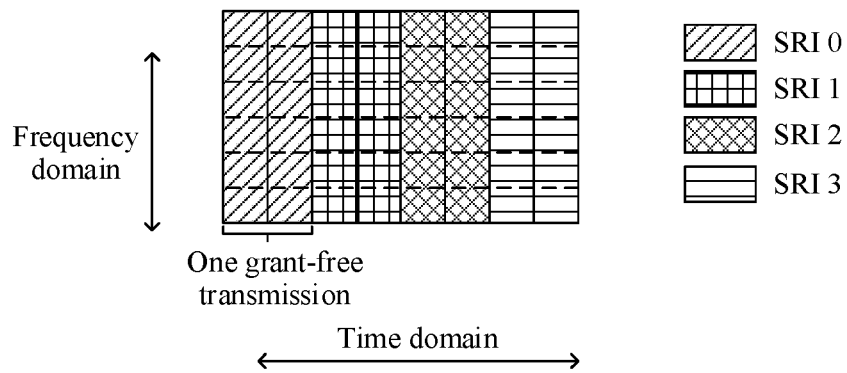
FIG. 8B is a diagram 2 of a correspondence that is between each time-domain resource unit of a grant-free time-frequency resource and a precoding matrix and that is in an information transmission method according to an embodiment of this application.

FIG. 8B is a diagram 2 of a correspondence that is between each time-domain resource unit of a grant-free time-frequency resource and a precoding matrix and that is in an information transmission method according to an embodiment of this application. As shown in FIG. 8B, the grant-free time-frequency resource includes the plurality of time-domain resource units, and the length of each time-domain resource unit is the length of the resource corresponding to the grant-free transmission. A precoding configuration corresponding to the first grant-free transmission is the SRI 0, a precoding configuration corresponding to the second grant-free transmission is the SRI 1, and a precoding configuration corresponding to the third grant-free transmission is the SRI 2. By analogy, a precoding configuration corresponding to an grant-free transmission is an SRI j, where j=mod(i, 4), and mod( ) is a modulo function.

In the foregoing example, the length of the resource corresponding to the grant-free transmission is used as the granularity of the time-domain resource unit for description. For a specific implementation of traversing the precoding configurations based on an another-type granularity of the time-domain resource unit, refer to the foregoing description. Details are not described herein again.

In the implementations performed when the timer is invalid, the terminal device may perform traversing based on the plurality of preset precoding configurations, and does not need to report the plurality of preset precoding configurations to the access network device. In other words, if the timer is invalid, the terminal device may use an open-loop multi-antenna transmission mode; to be specific, the terminal device traverses the plurality of preset precoding configurations, and the access network device does not need to know the plurality of preset precoding configurations.

In this embodiment of this application, the plurality of implementations that the terminal device has when the timer is invalid are further provided, thereby ensuring the flexibility of precoding configurations of different granularities of the time-domain resource unit or the frequency domain resource unit, so that the inadaptation of the precoding configuration caused by the channel change is effectively avoided, thereby improving the system performance. In addition, the uplink information is transmitted on each time-domain resource unit based on the precoding configuration corresponding to each time-domain resource unit, so that the diversity gain of the terminal device can be effectively increased.

An embodiment of this application may further provide a plurality of information transmission methods. The following FIG. 9A and FIG. 9B are two possible examples.

Figure 9A:
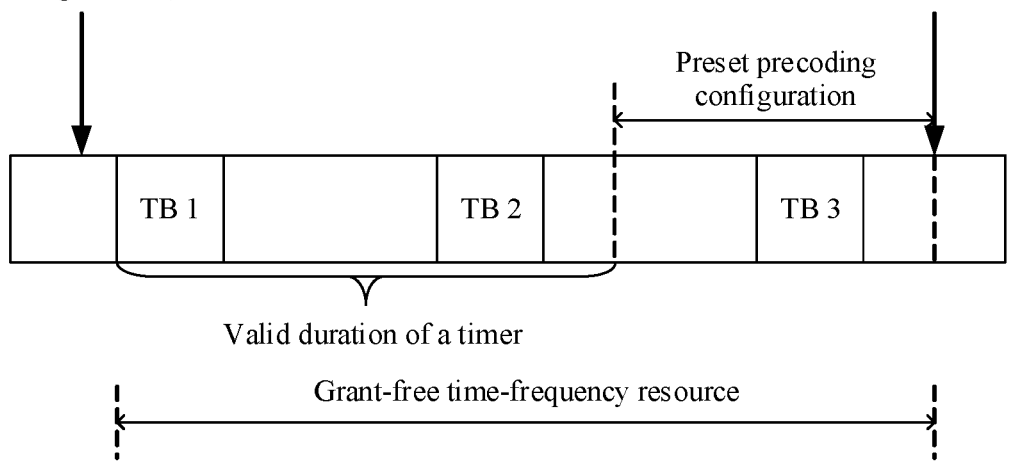
FIG. 9A is a schematic diagram 1 of transmission in an information transmission method according to an embodiment of this application.

FIG. 9A is a schematic diagram 1 of transmission in an information transmission method according to an embodiment of this application. Referring to FIG. 9A, it can be learned that before performing grant-free transmission, a terminal device receives an RRC message sent by an access network device, where the RRC message may include a plurality of precoding configurations and configuration information of valid duration of a timer. After receiving the RRC message, the terminal device may start the timer, and send a transport block (Transport Block, TB for short) 1 and a TB 2 to the access network device in the valid duration of the timer by using the plurality of configured precoding configurations. After the timer expires, the terminal device may send a TB 3 to the access network device on the grant-free time-frequency resource by using a preset precoding configuration, until the terminal device receives an RRC message or DCI that includes a new precoding configuration and that is sent by the access network.

In the information transmission method shown in FIG. 9A, in the valid duration of the timer, before transmitting the TB 1 or the TB 2 by using the plurality of configured precoding configurations, the terminal device may traverse the plurality of configured precoding configurations by using a preset granularity of a time-domain resource unit or a frequency domain resource unit, to determine a precoding configuration corresponding to each time-domain resource unit or frequency domain resource unit of the grant-free time-frequency resource.

Figure 9B:
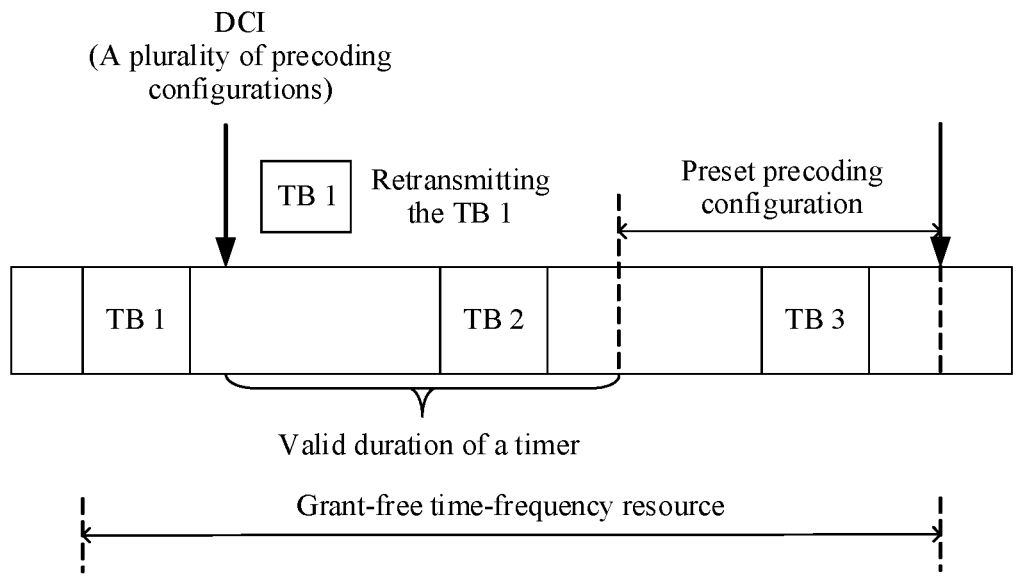
FIG. 9B is a schematic diagram 2 of transmission in an information transmission method according to an embodiment of this application.

FIG. 9B is a schematic diagram 2 of transmission in an information transmission method according to an embodiment of this application. Referring to FIG. 9B, a terminal device may perform grant-free initial transmission on a grant-free time-frequency resource by using a preset precoding configuration, and send a TB 1 to an access network device. The access network device may send DCI to the terminal device after receiving the TB 1, where the DCI may include the plurality of precoding configurations and configuration information of valid duration of the timer. After receiving the DCI returned by the access network device based on the TB 1, the terminal device may start the timer, retransmit the TB 1, to be specific, send the TB 1 to the access network device again, in the valid duration of the timer by using the plurality of configured precoding configurations, and send a TB 2 to the access network device in the valid duration of the timer by using the plurality of configured precoding configurations. After the timer expires, the terminal device may send a TB 3 to the access network device on the grant-free time-frequency resource by using the preset precoding configuration, until the terminal device receives an RRC message or DCI that includes a new precoding configuration and that is sent by the access network.

In the information transmission method shown in FIG. 9B, in the valid duration of the timer, before retransmitting the TB 1 or transmitting the TB 2 by using the plurality of configured precoding configurations, the terminal device may traverse the plurality of configured precoding configurations by using a preset granularity of a time-domain resource unit or a frequency domain resource unit, to determine a precoding configuration corresponding to each time-domain resource unit or frequency domain resource unit of the grant-free time-frequency resource.

In the information transmission method, use duration of a precoding configuration may be limited by using the valid duration of the timer, and uplink information is sent on the grant-free time-frequency resource by using at least one precoding configuration. Therefore, a precoding configuration used for transmitting the uplink information on the grant-free time-frequency resource is flexible and variable, so that inadaptation of a precoding configuration caused by a channel change is effectively avoided, thereby improving system performance.

Figure 10:
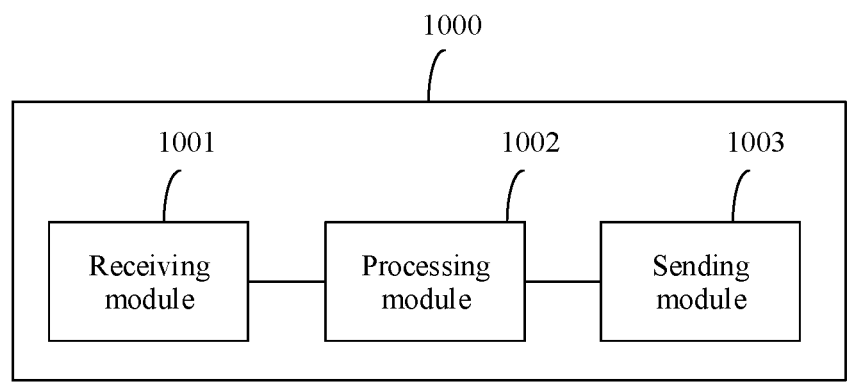
FIG. 10 is a schematic structural diagram 1 of a terminal device according to an embodiment of this application.

An embodiment of this application provides a terminal device. The terminal device may perform a method performed by a terminal device in any one of the methods in FIG. 2 to FIG. 9B. FIG. 10 is a schematic structural diagram 1 of a terminal device according to an embodiment of this application. An apparatus 1000 shown in FIG. 10 may be the terminal device, and may include:

a receiving module 1001, configured to receive at least one precoding configuration from an access network device;

a processing module 1002, configured to start a timer; and a sending module 1003, configured to send uplink information to the access network device on a configured grant-free time-frequency resource in valid duration of the timer by using the at least one precoding configuration.

Optionally, the receiving module 1001 is further configured to receive configuration information of the valid duration from the access network device.

Optionally, each precoding configuration includes at least one of the following: an SRI, a TRI, and a TPMI.

Optionally, if there are a plurality of precoding configurations, the processing module 1002 is further configured to traverse the plurality of precoding configurations by using a preset granularity of a frequency domain resource unit, to determine a precoding configuration corresponding to each frequency domain resource unit of the grant-free time-frequency resource, where two adjacent frequency domain resource units in the grant-free time-frequency resource correspond to different precoding configurations.

Optionally, the granularity of the frequency domain resource unit includes any one of the following: an RB or a PRG.

Optionally, if there are a plurality of precoding configurations, the processing module 1002 is further configured to traverse the plurality of precoding configurations by using a preset granularity of a time-domain resource unit, to determine a precoding configuration corresponding to each time-domain resource unit of the grant-free time-frequency resource, where two adjacent time-domain resource units in the grant-free time-frequency resource correspond to different precoding configurations.

Optionally, the receiving module 1002 is further configured to receive configuration information of grant-free transmission from the access network device, where the configuration information of the grant-free transmission includes the at least one precoding configuration, and configuration information of the grant-free time-frequency resource.

Optionally, the configuration information of the grant-free transmission further includes the configuration information of the valid duration.

The terminal device provided in this embodiment of this application may perform the information transmission method that is performed by a terminal device and that is shown in any one of FIG. 2 to FIG. 9B. For specific implementation and beneficial effects thereof, refer to the foregoing descriptions. Details are not described herein again.

Figure 11:
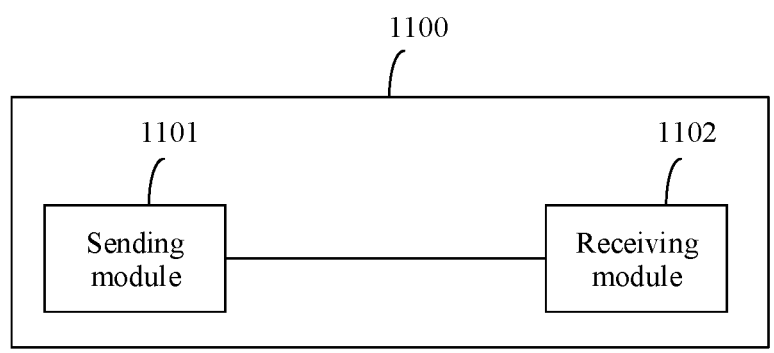
FIG. 11 is a schematic structural diagram 1 of an access network device according to an embodiment of this application.

An embodiment of this application may further provide an access network device. The access network device may perform the information transmission method that is performed by an access network device and that is in any one of FIG. 2 to FIG. 9B. FIG. 11 is a schematic structural diagram 1 of an access network device according to an embodiment of this application. An apparatus 1100 shown in FIG. 11 may be the access network device, and may include:

a sending module 1101, configured to send at least one precoding configuration to a terminal device; and a receiving module 1102, configured to receive uplink information from the terminal device, where the uplink information is information sent by the terminal device on a configured grant-free time-frequency resource in valid duration of a timer by using the at least one precoding configuration, and the timer is started by the terminal device after the terminal device receives the at least one precoding configuration.

In an implementable manner, the access network device may further include:

a processing module, configured to determine the at least one precoding configuration based on a multi-antenna transmission capability of the terminal device.

In another implementable manner, the multi-antenna transmission capability may include at least one of the following: a maximum quantity of multi-antenna transmission ports, a quantity of transport layers, coherent information between antenna ports, and the like that are supported by the terminal device.

In still another implementable manner, the sending module 1101 is further configured to send configuration information of the valid duration to the terminal device.

In still another implementable manner, the configuration information of the valid duration may be located in an RRC message or DCI.

In still another implementable manner, each precoding configuration may include at least one of the following: an SRI, a TRI, and a TPMI.

In still another implementable manner, the uplink information is information sent by the terminal device on each frequency domain resource unit of the grant-free time-frequency resource by using a precoding configuration corresponding to each frequency domain resource unit.

The precoding configuration corresponding to each frequency domain resource unit is determined by the terminal device by traversing the plurality of precoding configurations by using a preset granularity of a frequency domain resource unit.

Optionally, the granularity of the frequency domain resource unit is an RB or a PRB.

In still another implementable manner, the uplink information may be information sent by the terminal device on each time-domain resource unit of the grant-free time-frequency resource by using a precoding configuration corresponding to each time-domain resource unit.

The precoding configuration corresponding to each time-domain resource unit is determined by the terminal device by traversing the plurality of precoding configurations by using a preset granularity of a time-domain resource unit.

In still another implementable manner, the sending module 1101 is further configured to send configuration information of grant-free transmission to the terminal device, where the configuration information of the grant-free transmission includes the at least one precoding configuration, and configuration information of the grant-free time-frequency resource.

In still another implementable manner, the configuration information of the grant-free transmission further includes the configuration information of the valid duration.

In still another implementable manner, the receiving module 1102 is further configured to: after the timer of the terminal device is invalid, receive the uplink information sent on the configured grant-free time-frequency resource by using a preset precoding configuration.

In still another implementable manner, the receiving module 1102 is further configured to: after the timer is invalid, receive the uplink information sent by the terminal device on the grant-free time-frequency resource by using the precoding configuration corresponding to each frequency domain resource unit, where the precoding configuration corresponding to each frequency domain resource unit is determined by the terminal device by traversing a plurality of preset precoding configurations by using the preset granularity of the frequency domain resource unit, and two adjacent frequency domain resource units in the grant-free time-frequency resource correspond to different precoding configurations.

In still another implementable manner, the receiving module 1102 is further configured to: after the timer is invalid, receive the uplink information sent by the terminal device on the grant-free time-frequency resource by using the precoding configuration corresponding to each time-domain resource unit, where the precoding configuration corresponding to each time-domain resource unit is determined by the terminal device by traversing a plurality of preset precoding configurations by using the preset granularity of the time-domain resource unit, and two adjacent time-domain resource units in the grant-free time-frequency resource correspond to different precoding configurations.

The access network device provided in this embodiment of this application may perform the information transmission method that is performed by an access network device and that is shown in any one of FIG. 2 to FIG. 9B. For specific implementation and beneficial effects thereof, refer to the foregoing descriptions. Details are not described herein again.

Figure 12:
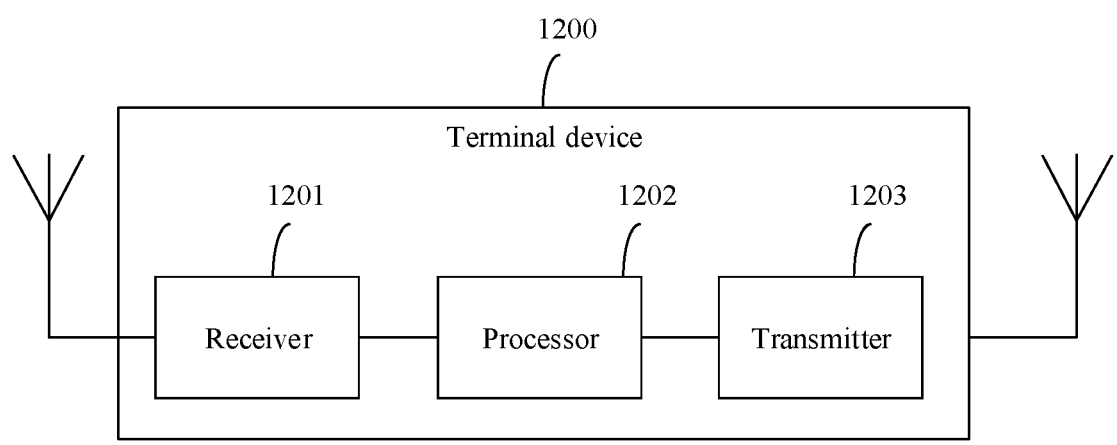
FIG. 12 is a schematic structural diagram 2 of a terminal device according to an embodiment of this application.

An embodiment of this application may further provide a terminal device. The terminal device may perform a method performed by a terminal device in any one of the methods in FIG. 2 to FIG. 9B. FIG. 12 is a schematic structural diagram 2 of a terminal device according to an embodiment of this application. As shown in FIG. 12, a terminal device 1200 may include a receiver 1201, a processor 1202, and a transmitter 1203. The receiver 1201 and the transmitter 1203 are separately connected to the processor 1202.

The receiver 1201 is configured to receive at least one precoding configuration from an access network device.

The processor 1202 is configured to start a timer.

The transmitter 1203 is configured to send uplink information to the access network device on a configured grant-free time-frequency resource in valid duration of the timer by using the at least one precoding configuration.

Optionally, the receiver 1201 is further configured to receive configuration information of the valid duration from the access network device.

In another implementable manner, each precoding configuration includes at least one of the following: an SRI, a TRI, and a TPMI.

In still another implementable manner, if there are a plurality of precoding configurations, the processor 1202 is further configured to traverse the plurality of precoding configurations by using a preset granularity of a frequency domain resource unit, to determine a precoding configuration corresponding to each frequency domain resource unit of the grant-free time-frequency resource, where two adjacent frequency domain resource units in the grant-free time-frequency resource correspond to different precoding configurations.

In still another implementable manner, the granularity of the frequency domain resource unit may include an RB or a PRB.

In still another implementable manner, if there are a plurality of precoding configurations, the processor 1202 is further configured to traverse the plurality of precoding configurations by using a preset granularity of a time-domain resource unit, to determine a precoding configuration corresponding to each time-domain resource unit of the grant-free time-frequency resource, where two adjacent time-domain resource units in the grant-free time-frequency resource correspond to different precoding configurations.

In still another implementable manner, the receiver 1201 is further configured to receive configuration information of grant-free transmission from the access network device, where the configuration information of the grant-free transmission includes the at least one precoding configuration, and configuration information of the grant-free time-frequency resource.

In still another implementable manner, the configuration information of the grant-free transmission further includes the configuration information of the valid duration.

In still another implementable manner, the transmitter 1203 is further configured to: if the timer is invalid, send the uplink information to the access network device on the configured grant-free time-frequency resource by using a preset precoding configuration.

In still another implementable manner, the processor 1202 is further configured to: if the timer is invalid, traverse a plurality of preset precoding configurations by using the preset granularity of the frequency domain resource unit, to determine the precoding configuration corresponding to each frequency domain resource unit of the grant-free time-frequency resource, where two adjacent frequency domain resource units in the grant-free time-frequency resource correspond to different precoding configurations.

In still another implementable manner, the processor 1202 is further configured to: if the timer is invalid, traverse a plurality of preset precoding configurations by using the preset granularity of the time-domain resource unit, to determine the precoding configuration corresponding to each time-domain resource unit of the grant-free time-frequency resource, where two adjacent time-domain resource units in the grant-free time-frequency resource correspond to different precoding configurations.

Optionally, an embodiment of this application may further provide a computer program product, where the computer program product includes program code for performing the information transmission method that is performed by a terminal device and that is shown in any one of FIG. 2 to FIG. 9B.

When the computer program product runs on a computer, the computer may perform the information transmission method that is performed by the terminal device and that is shown in any one of FIG. 2 to FIG. 9B.

Optionally, an embodiment of this application may further provide a computer-readable storage medium, where the storage medium is configured to store a computer program product, and the computer program product includes program code. The program code may include program code used to perform the information transmission method that is performed by a terminal device and that is shown in any one of FIG. 2 to FIG. 9B.

When the computer program product runs on a computer, the computer may perform the information transmission method that is performed by the terminal device and that is shown in any one of FIG. 2 to FIG. 9B.

The computer-readable storage medium may be an internal memory in the terminal device 1200 shown in FIG. 12, or may be an external memory connected to the terminal device 1200 shown in FIG. 12. The program code in the computer program product may be executed, for example, by the processor 1202 in the terminal device 1200 shown in FIG. 12.

The terminal device, the computer program product, and the computer-readable storage medium provided in the embodiments of this application may perform the information transmission method that is performed by the terminal device and that is shown in any one of FIG. 2 to FIG. 9B. For a specific implementation process and beneficial effects thereof, refer to the foregoing descriptions. Details are not described herein again.

In an example, the apparatus 1000 shown in FIG. 10 may alternatively be a chip. The processing module 1002 is specifically a processing kernel (or a processor) of the chip. The receiving module 1001 is specifically an input port (or an input circuit) of the chip. The sending module 1003 may be specifically an output port (or an output circuit) of the chip.

In a specific implementation, the input port of the chip may be configured to receive the at least one precoding configuration from the access network device, the processing kernel of the chip may be configured to start the timer, and the output port of the chip may be configured to send the uplink information on the configured grant-free time-frequency resource in the valid duration of the timer by using the at least one precoding configuration.

Optionally, the input port of the chip may be further configured to perform another function corresponding to the receiving module 1001 in the foregoing embodiment, but an input of the input port may be a signal in a form of a baseband signal, or a signal from another component or circuit inside a same device. The processing kernel of the chip may be further configured to perform another function of the processing module 1002. The output port of the chip may be further configured to perform another function corresponding to the sending module 1003 in the foregoing embodiment, but an output of the output port may be a signal in the form of the baseband signal, or a signal output to another component or circuit inside a same device.

The chip provided in this embodiment of this application may also perform the information transmission method that is performed by a terminal device and that is shown in any one of FIG. 2 to FIG. 9B. For a specific implementation process and beneficial effects thereof, refer to the foregoing descriptions. Details are not described herein again.

Figure 13:
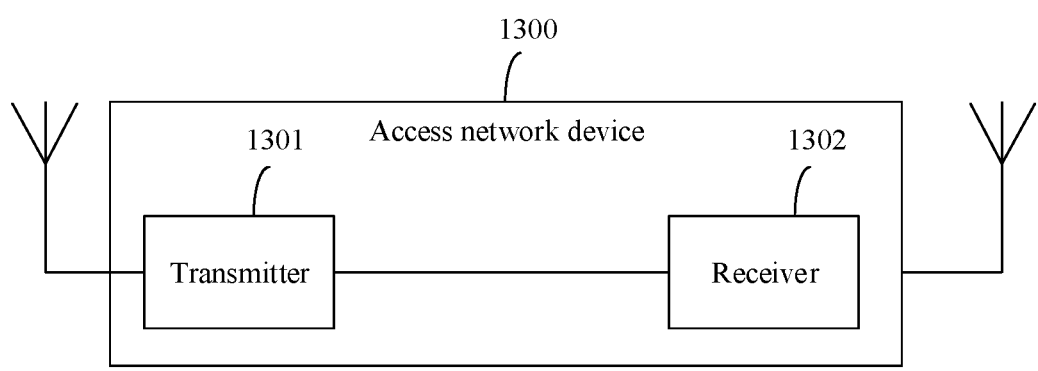
FIG. 13 is a schematic structural diagram 2 of an access network device according to an embodiment of this application.

An embodiment of this application may further provide an access network device. The access network device may perform the information transmission method that is performed by an access network device and that is in any one of FIG. 2 to FIG. 9B. FIG. 13 is a schematic structural diagram 2 of an access network device according to an embodiment of this application. As shown in FIG. 13, the access network device 1300 may include a transmitter 1301 and a receiver 1302.

The transmitter 1301 is configured to send at least one precoding configuration to a terminal device.

The receiver 1302 is configured to receive uplink information from the terminal device, where the uplink information is information sent by the terminal device on a configured grant-free time-frequency resource in valid duration of a timer by using the at least one precoding configuration, and the timer is started by the terminal device after the terminal device receives the at least one precoding configuration.

In an implementable manner, the access network device may further include:

a processor, configured to determine the at least one precoding configuration based on a multi-antenna transmission capability of the terminal device.

In another implementable manner, the multi-antenna transmission capability may include at least one of the following: a maximum quantity of multi-antenna transmission ports, a quantity of transport layers, coherent information between antenna ports, and the like that are supported by the terminal device.

In still another implementable manner, the transmitter 1301 is further configured to send configuration information of the valid duration to the terminal device.

In still another implementable manner, the configuration information of the valid duration may be located in an RRC message or DCI.

In still another implementable manner, each precoding configuration may include at least one of the following: an SRI, a TRI, and a TPMI.

In still another implementable manner, the uplink information is information sent by the terminal device on each frequency domain resource unit of the grant-free time-frequency resource by using a precoding configuration corresponding to each frequency domain resource unit.

The precoding configuration corresponding to each frequency domain resource unit is determined by the terminal device by traversing the plurality of precoding configurations by using a preset granularity of a frequency domain resource unit.

Optionally, the granularity of the frequency domain resource unit is an RB or a PRB.

In still another implementable manner, the uplink information may be information sent by the terminal device on each time-domain resource unit of the grant-free time-frequency resource by using a precoding configuration corresponding to each time-domain resource unit.

The precoding configuration corresponding to each time-domain resource unit is determined by the terminal device by traversing the plurality of precoding configurations by using a preset granularity of a time-domain resource unit.

In still another implementable manner, the transmitter 1301 is further configured to send configuration information of grant-free transmission to the terminal device, where the configuration information of the grant-free transmission includes the at least one precoding configuration, and configuration information of the grant-free time-frequency resource.

In still another implementable manner, the configuration information of the grant-free transmission further includes the configuration information of the valid duration.

In still another implementable manner, the receiver 1302 is further configured to: after the timer of the terminal device is invalid, receive the uplink information sent on the configured grant-free time-frequency resource by using a preset precoding configuration.

In still another implementable manner, the receiver 1302 is further configured to: after the timer is invalid, receive the uplink information sent by the terminal device on the grant-free time-frequency resource by using the precoding configuration corresponding to each frequency domain resource unit, where the precoding configuration corresponding to each frequency domain resource unit is determined by the terminal device by traversing a plurality of preset precoding configurations by using the preset granularity of the frequency domain resource unit, and two adjacent frequency domain resource units in the grant-free time-frequency resource correspond to different precoding configurations.

In still another implementable manner, the receiver 1302 is further configured to: after the timer is invalid, receive the uplink information sent by the terminal device on the grant-free time-frequency resource by using the precoding configuration corresponding to each time-domain resource unit, where the precoding configuration corresponding to each time-domain resource unit is determined by the terminal device by traversing a plurality of preset precoding configurations by using the preset granularity of the time-domain resource unit, and two adjacent time-domain resource units in the grant-free time-frequency resource correspond to different groups of precoding configurations.

Optionally, an embodiment of this application may further provide a computer program product, where the computer program product includes program code for performing the information transmission method that is performed by an access network device and that is shown in any one of FIG. 2 to FIG. 9B.

When the computer program product runs on a computer, the computer may perform the information transmission method that is performed by the access network device and that is shown in any one of FIG. 2 to FIG. 9B.

Optionally, an embodiment of this application may further provide a computer-readable storage medium, where the storage medium is configured to store a computer program product, and the computer program product includes program code. The program code may include program code used to perform the information transmission method that is performed by the access network device and that is shown in any one of FIG. 2 to FIG. 9B.

When the computer program product runs on a computer, the computer may perform the information transmission method that is performed by the access network device and that is shown in any one of FIG. 2 to FIG. 9B.

The computer-readable storage medium may be an internal memory in the access network device 1300 shown in FIG. 13, or may be an external memory connected to the access network device 1300 shown in FIG. 13. The program code in the computer program product may be executed, for example, by the processor in the access network device 1300 shown in FIG. 13.

The access network device, the computer program product, and the computer-readable storage medium provided in the embodiments of this application may perform the information transmission method that is performed by the access network device and that is shown in any one of FIG. 2 to FIG. 9B. For a specific implementation process and beneficial effects thereof, refer to the foregoing descriptions. Details are not described herein again.

In an example, the apparatus 1100 shown in FIG. 11 may alternatively be a chip. The sending module 1101 may be specifically an output port (or an output circuit) of the chip. The receiving module 1102 is specifically an input port (or an input circuit) of the chip. The processing module is specifically a processing kernel (or a processor) of the chip.

In a specific implementation, the output port of the chip may be configured to send the at least one precoding configuration, and the input port of the chip may be configured to receive the uplink information from the terminal device, where the uplink information is information sent by the terminal device on the configured grant-free time-frequency resource in the valid duration of the timer by using the at least one precoding configuration, and the timer is started by the terminal device after the terminal device receives the at least one precoding configuration.

Optionally, the output port of the chip may be further configured to perform another function corresponding to the sending module 1101 in the foregoing embodiment, but an output of the output port may be a signal in a form of a baseband signal, or a signal output to another component or circuit inside a same device. The input port of the chip may be further configured to perform another function corresponding to the receiving module 1102 in the foregoing embodiment, but an input of the input port may be a signal in the form of the baseband signal, or a signal from another component or circuit inside a same device. The processing kernel of the chip may be further configured to perform another function of the foregoing processing module.

The chip provided in this embodiment of this application may also perform the information transmission method that is performed by an access network device and that is shown in any one of FIG. 2 to FIG. 9B. For a specific implementation process and beneficial effects thereof, refer to the foregoing descriptions. Details are not described herein again.

It should be noted that all or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instructions are stored in a computer-readable storage medium, or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. An information transmission method, comprising:
receiving a plurality of precoding configurations from an access network device;
traversing the plurality of precoding configurations by using a preset granularity of a frequency domain resource unit to determine a precoding configuration corresponding to each frequency domain resource unit of a grant-free time-frequency resource, wherein two adjacent frequency domain resource units in the grant-free time-frequency resource correspond to different precoding configurations;
starting a timer; and
sending uplink information to the access network device on a configured grant-free time-frequency resource in valid duration of the timer by using at least one precoding configuration.

2. The method according to claim 1, wherein the method comprises:
receiving configuration information of the valid duration from the access network device.

3. The method according to claim 1, wherein the receiving a plurality of precoding configurations from an access network device comprises:
receiving configuration information of grant-free transmission from the access network device, wherein the configuration information of the grant-free transmission comprises the plurality of precoding configurations, and configuration information of the grant-free time-frequency resource.

4. The method according to claim 3, wherein the configuration information of the grant-free transmission further comprises the configuration information of the valid duration.

5. The method according to claim 1, wherein the method further comprises:
if the timer is invalid, sending the uplink information to the access network device on the configured grant-free time-frequency resource by using a preset precoding configuration.

6. A terminal device, the terminal device comprising at least one processor configured to execute instructions stored in a non-transitory medium, wherein the instructions instruct the at least one processor to:
receive a plurality of precoding configurations from an access network device;
traverse the plurality of precoding configurations by using a preset granularity of a frequency domain resource unit to determine a precoding configuration corresponding to each frequency domain resource unit of a grant-free time-frequency resource, wherein two adjacent frequency domain resource units in the grant-free time-frequency resource correspond to different precoding configurations;
start a timer; and
send uplink information to the access network device on a configured grant-free time-frequency resource in valid duration of the timer by using at least one precoding configuration.

7. The terminal device according to claim 6, wherein the instructions instruct the at least one processor to:
receive configuration information of the valid duration from the access network device.

8. The terminal device according to claim 6, wherein each precoding configuration comprises at least one of the following: a sounding reference signal resource indicator (SRI), a transmission rank indicator (TRI), and a transmitted precoding matrix indicator (TPMI).

9. The terminal device according to claim 6, wherein the preset granularity of the frequency domain resource unit comprises any one of the following: a resource block (RB) and a precoding resource block group (PRG).

10. The terminal device according to claim 6, wherein the instructions instruct the at least one processor to:
receive configuration information of grant-free transmission from the access network device, wherein the configuration information of the grant-free transmission comprises the at least one precoding configuration, and configuration information of the grant-free time-frequency resource.

11. The terminal device according to claim 10, wherein the configuration information of the grant-free transmission further comprises the configuration information of the valid duration.

12. The terminal device according to claim 6, wherein the instructions instruct the at least one processor to:
if the timer is invalid, send the uplink information to the access network device on the configured grant-free time-frequency resource by using a preset precoding configuration.

13. The terminal device according to claim 6, wherein the instructions instruct the at least one processor to:
if the timer is invalid, traverse a plurality of preset precoding configurations by using a preset granularity of a frequency domain resource unit, to determine a precoding configuration corresponding to each frequency domain resource unit of the grant-free time-frequency resource, wherein two adjacent frequency domain resource units in the grant-free time-frequency resource correspond to different precoding configurations.

14. An information transmission method, comprising:
receiving a plurality of precoding configurations from an access network device;
traversing the plurality of precoding configurations by using a preset granularity of a time-domain resource unit to determine a precoding configuration corresponding to each time-domain resource unit of a grant-free time-frequency resource, wherein two adjacent time-domain resource units in the grant-free time-frequency resource correspond to different precoding configurations;
starting a timer; and
sending uplink information to the access network device on a configured grant-free time-frequency resource in valid duration of the timer by using at least one precoding configuration.

15. The method according to claim 14, wherein the method comprises:
receiving configuration information of the valid duration from the access network device.

16. The method according to claim 14, wherein the receiving a plurality of precoding configuration from an access network device comprises:
receiving configuration information of grant-free transmission from the access network device, wherein the configuration information of the grant-free transmission comprises the plurality of precoding configuration, and configuration information of the grant-free time-frequency resource.

17. The method according to claim 16, wherein the configuration information of the grant-free transmission further comprises the configuration information of the valid duration.

18. The method according to claim 14, wherein the method further comprises:
if the timer is invalid, sending the uplink information to the access network device on the configured grant-free time-frequency resource by using a preset precoding configuration.

19. A terminal device, the terminal device comprising at least one processor configured to execute instructions stored in a non-transitory medium, wherein the instructions instruct the at least one processor to:
receive a plurality of precoding configuration from an access network device;
traverse the plurality of precoding configurations by using a preset granularity of a time-domain resource unit to determine a precoding configuration corresponding to each time-domain resource unit of a grant-free time-frequency resource, wherein two adjacent time-domain resource units in the grant-free time-frequency resource correspond to different precoding configurations;
start a timer; and
send uplink information to the access network device on a configured grant-free time-frequency resource in valid duration of the timer by using at least one precoding configuration.

20. The terminal device according to claim 19, wherein the instructions instruct the at least one processor to:
receive configuration information of the valid duration from the access network device.

21. The terminal device according to claim 19, wherein each precoding configuration comprises at least one of the following: a sounding reference signal resource indicator (SRI), a transmission rank indicator (TRI), and a transmitted precoding matrix indicator (TPMI).

22. The terminal device according to claim 19, wherein the instructions instruct the at least one processor to:
receive configuration information of grant-free transmission from the access network device, wherein the configuration information of the grant-free transmission comprises the at least one precoding configuration, and configuration information of the grant-free time-frequency resource.

23. The terminal device according to claim 22, wherein the configuration information of the grant-free transmission further comprises the configuration information of the valid duration.

24. The terminal device according to claim 19, wherein the instructions instruct the at least one processor to:
if the timer is invalid, send the uplink information to the access network device on the configured grant-free time-frequency resource by using a preset precoding configuration.

25. The terminal device according to claim 19, wherein the instructions instruct the at least one processor to:
if the timer is invalid, traverse a plurality of preset precoding configurations by using a preset granularity of a time-domain resource unit, to determine a precoding configuration corresponding to each time-domain resource unit of the grant-free time-frequency resource, wherein two adjacent time-domain resource units in the grant-free time-frequency resource correspond to different precoding configurations.

* * * * *